(12) United States Patent
Jia et al.

(10) Patent No.: US 11,115,126 B2
(45) Date of Patent: Sep. 7, 2021

(54) FIBER COMMUNICATION SYSTEMS AND METHODS

(71) Applicant: CABLE TELEVISION LABORATORIES, INC, Louisville, CO (US)

(72) Inventors: Zhensheng Jia, Superior, CO (US); Luis Alberto Campos, Superior, CO (US); Curtis Dean Knittle, Superior, CO (US); Jing Wang, Broomfield, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 16/408,285

(22) Filed: May 9, 2019

(65) Prior Publication Data
US 2019/0268074 A1    Aug. 29, 2019

Related U.S. Application Data

(63) Continuation-in-part of application No. 15/861,303, filed on Jan. 3, 2018, which is a continuation of
(Continued)

(51) Int. Cl.
*H04J 14/00* (2006.01)
*H04B 10/50* (2013.01)
(Continued)

(52) U.S. Cl.
CPC ......... *H04B 10/504* (2013.01); *H04B 10/502* (2013.01); *H04B 10/505* (2013.01);
(Continued)

(58) Field of Classification Search
CPC .. H04B 10/27; H04B 10/0795; H04B 10/564; H04B 10/2507; H04B 10/5057; H04B 10/50575; H04B 10/58; H04B 10/572; H04B 10/5161; H04B 10/6161; H04B 10/40; H04J 14/02; H04J 14/06; H04J 14/0278; H04J 14/0247; H04J 14/0249; H04J 14/0246
USPC ...... 398/66, 67, 68, 69, 70, 71, 72, 79, 100, 398/158, 159, 202, 208, 205, 135, 136, 398/204, 91, 207, 183, 184, 188, 65, 152, 398/192, 193, 194, 195
See application file for complete search history.

(56) References Cited

U.S. PATENT DOCUMENTS

| 5,347,525 A * | 9/1994 | Faris | H04B 10/50 372/18 |
| 7,929,584 B2 * | 4/2011 | Zhang | H04J 14/025 372/26 |

(Continued)

*Primary Examiner* — Hanh Phan
(74) *Attorney, Agent, or Firm* — Armstrong Teasdale LLP

(57) ABSTRACT

An injection locked transmitter for an optical communication network includes a master seed laser source input substantially confined to a single longitudinal mode, an input data stream, and a laser injected modulator including at least one slave laser having a resonator frequency that is injection locked to a frequency of the single longitudinal mode of the master seed laser source. The laser injected modulator is configured to receive the master seed laser source input and the input data stream, and output a laser modulated data stream.

20 Claims, 17 Drawing Sheets

Related U.S. Application Data application No. 15/283,632, filed on Oct. 3, 2016, now Pat. No. 9,912,409.

(60) Provisional application No. 62/321,211, filed on Apr. 12, 2016, provisional application No. 62/669,035, filed on May 9, 2018, provisional application No. 62/671,270, filed on May 14, 2018, provisional application No. 62/678,110, filed on May 30, 2018.

(51) Int. Cl.
*H04B 10/63* (2013.01)
*H04B 10/532* (2013.01)
*H04B 10/64* (2013.01)
*H04J 14/06* (2006.01)
*H04J 14/04* (2006.01)
*H04Q 11/00* (2006.01)
*H04J 14/02* (2006.01)

(52) U.S. Cl.
CPC ......... *H04B 10/506* (2013.01); *H04B 10/532* (2013.01); *H04B 10/63* (2013.01); *H04B 10/64* (2013.01); *H04J 14/0282* (2013.01); *H04J 14/04* (2013.01); *H04J 14/06* (2013.01); *H04Q 11/00* (2013.01)

(56) References Cited

U.S. PATENT DOCUMENTS

| | | | |
|---|---|---|---|
| 10,623,104 B2* | 4/2020 | Zhou | H04B 10/61 |
| 2009/0220230 A1* | 9/2009 | Kim | H04B 10/272 |
| | | | 398/72 |
| 2010/0215368 A1* | 8/2010 | Qian | H04J 14/0252 |
| | | | 398/67 |
| 2012/0087666 A1* | 4/2012 | Kwon | H04J 14/0221 |
| | | | 398/79 |

* cited by examiner

FIBER COMMUNICATION SYSTEMS AND METHODS

CROSS REFERENCE TO RELATED APPLICATIONS

This application is a continuation in part of U.S. application Ser. No. 15/861,303, filed on Jan. 3, 2018, which prior application is a continuation of U.S. application Ser. No. 15/283,632, filed on Oct. 3, 2016, now U.S. Pat. No. 9,912,409, issued Mar. 6, 2018. U.S. application Ser. No. 15/283,632 claims the benefit of and priority to U.S. Provisional Patent Application Ser. No. 62/321,211, filed Apr. 12, 2016. The present application also claims the benefit of and priority to U.S. Provisional Patent Application Ser. No. 62/669,035, filed May 9, 2018, to U.S. Provisional Patent Application Ser. No. 62/671,270, filed May 14, 2018, and to U.S. Provisional Patent Application Ser. No. 62/678,110, filed May 30, 2018. All of these applications are incorporated herein by reference in their entireties.

BACKGROUND

The field of the disclosure relates generally to fiber communication networks, and more particularly, to optical networks utilizing wavelength division multiplexing.

Telecommunications networks include an access network through which end user subscribers connect to a service provider. Bandwidth requirements for delivering high-speed data and video services through the access network are rapidly increasing to meet growing consumer demands. At present, data delivery over the access network is growing by gigabits (Gb)/second for residential subscribers, and by multi-Gb/s for business subscribers. Present access networks are based on passive optical network (PON) access technologies, which have become the dominant system architecture to meet the growing high capacity demand from end users.

Gigabit PON and Ethernet PON architectures are conventionally known, and presently provide about 2.5 Gb/s data rates for downstream transmission and 1.25 Gb/s for upstream transmission (half of the downstream rate). 10 Gb/s PON (XG-PON or IEEE 10G-EPON) has begun to be implemented for high-bandwidth applications, and a 40 Gb/s PON scheme, which is based on time and wavelength division multiplexing (TWDM and WDM) has recently been standardized. A growing need therefore exists to develop higher/faster data rates per-subscriber to meet future bandwidth demand, and also increase the coverage for services and applications, but while also minimizing the capital and operational expenditures necessary to deliver higher capacity and performance access networks.

One known solution to increase the capacity of a PON is the use of WDM technology to send a dedicated wavelength signal to end users. Current detection scheme WDM technology, however, is limited by its low receiver sensitivity, and also by the few options available to upgrade and scale the technology, particularly with regard to use in conjunction with the lower-quality legacy fiber environment. The legacy fiber environment requires operators to squeeze more capacity out of the existing fiber infrastructure to avoid costs associated with having to retrench new fiber installment. Conventional access networks typically include six fibers per node, servicing as many as 500 end users, such as home subscribers. Conventional nodes cannot be split further and do not typically contain spare (unused) fibers, and thus there is a need to utilize the limited fiber availability in a more efficient and cost-effective manner.

Coherent technology has been proposed as one solution to increase both receiver sensitivity and overall capacity for WDM-PON optical access networks, in both brown and green field deployments. Coherent technology offers superior receiver sensitivity and extended power budget, and high frequency selectivity that provides closely-spaced dense or ultra-dense WDM without the need for narrow band optical filters. Moreover, a multi-dimensional recovered signal experienced by coherent technology provides additional benefits to compensate for linear transmission impairments such as chromatic dispersion (CD) and polarization-mode dispersion (PMD), and to efficiently utilize spectral resources to benefit future network upgrades through the use of multi-level advanced modulation formats. Long distance transmission using coherent technology, however, requires elaborate post-processing, including signal equalizations and carrier recovery, to adjust for impairments experienced along the transmission pathway, thereby presenting significant challenges by significantly increasing system complexity.

Coherent technology in longhaul optical systems typically requires significant use of high quality discrete photonic and electronic components, such as digital-to-analog converters (DAC), analog-to-digital converters (ADC), and digital signal processing (DSP) circuitry such as an application-specific integrated circuit (ASIC) utilizing CMOS technology, to compensate for noise, frequency drift, and other factors affecting the transmitted channel signals over the long distance optical transmission. Coherent pluggable modules for metro solution have gone through C Form-factor pluggable (CFP) to CFP2 and future CFP4 via multi-source agreement (MSA) standardization to reduce their footprint, to lower costs, and also to lower power dissipation. However, these modules still require significant engineering complexity, expense, size, and power to operate, and therefore have not been efficient or practical to implement in access applications.

Furthermore, according to Nielsen's Law, if current trends continue, high-end end users are expected to require as much as 10 Gb/s by 2023, and 100 Gb/s by 2029. For the new and upcoming generations of communication systems performing under these requirements, the data speed will also need to be matched for upstream communications. However, conventional PONs seeking to approach the 100 Gb/s aggregating data rate suffer from several limitations, due to the reliance on traditional direct detection techniques, that render 100 Gb/s technically and economically infeasible for these PONs. The conventional direct detection PONs, for example, are known to have poor receiver sensitivity, to experience power fading due to chromatic dispersion at high symbol rates and long transmission distances, and to utilize bandwidth- and power-inefficient modulation. Besides frequency selectivity and linear detection, Coherent for PONs demonstrates superior receiver sensitivity, which can be translated to extend reach and split ratio.

In the downlink of conventional PONs, the complexity limits on the transceiver in an optical line terminal (OLT) at the headend, central office, and/or hub are less stringent than the limits placed on a receiver in an optical network unit (ONU), since the cost of the OLT transceiver, which sends and receives data to and from multiple ONUs, is shared by all end users supported in the respective network. In contrast, the cost of each ONU is born solely by the respective end user. Accordingly, lower costs and lower complexities will more significantly impact the ONU than the OLT. For this reason, the complexity and high cost of conventional coherent transceivers has been limited to point to point (P2P) applications, but prevented from implementation in point to multipoint (P2MP) PON applications. That is, despite the significant advantages offered by digital coherent technology, the complexity and high cost of conventional coherent transceivers has not been economically feasible for individual ONUs at the home location of each subscriber end-user.

P2P and P2MP applications differ in that they P2P connection provides a link between one transmitter and one receiver, whereas a P2MP application provides a link between one transmitter and multiple receivers. Accordingly, in the coherent paradigm, only two coherent transceivers may be needed in a P2P link, whereas the number of coherent transceivers needed in the P2MP link (i.e., one coherent transceiver for each ONU) may be significant (as many as 500, in the example above).

Therefore, the laser source is of critical importance for the realization of such coherent optical transmission systems. That is, one type of laser may not simply be substituted for another type without significantly affecting the network. Additionally, the frequency and phase noise of the laser will also significantly affect the performance of conventional optical coherent transceivers, and impairments therefrom have to be mitigated by carrier-phase recovery (CPR) techniques, since frequency and phase noise are directly related to each other, and are closely related to the linewidth of the laser.

Furthermore, the modulation speed and transmission distance of the network also will strongly depend on the spectral linewidth of the laser. That is, narrower linewidths are required for higher modulation speeds (data rates) and longer distance transmissions. Some conventional coherent transceivers use an external cavity laser (ECL). From the performance perspective, ECLs have demonstrated superior performance capabilities for coherent systems, sufficient for present long haul and metro distance sensitivity requirements. However, within the access environment, ECLs are considered prohibitively expensive if deployed at each ONU at an end user's home location. In contrast, Fabry-Perot laser diodes (FP-LD) and weak-resonant-cavity laser diode (WRC-FPLD) based transmitters are considerably less expensive than the costly externally tunable lasers such as ECLs or distributed feedback (DFB)/distributed Bragg reflector (DBR) lasers. However, use of these relatively lower-cost, simpler FP lasers is limited by transmission bandwidth and capacity, particularly in direct-detection systems, and is not applicable for coherent systems in the conventional use form.

BRIEF SUMMARY

In one aspect, an injection locked transmitter for an optical communication network includes a master seed laser source input substantially confined to a single longitudinal mode, an input data stream, and a laser injected modulator including at least one slave laser having a resonator frequency that is injection locked to a frequency of the single longitudinal mode of the master seed laser source. The laser injected modulator is configured to receive the master seed laser source input and the input data stream, and output a laser modulated data stream.

In another aspect, an optical network communication system includes, an input signal source, an optical frequency comb generator configured to receive the input signal source and output a plurality of phase synchronized coherent tone pairs. Each of the plurality of phase synchronized coherent tone pairs includes a first unmodulated signal and a second unmodulated signal. The system further include a first transmitter configured to receive the first unmodulated signal of a selected one of the plurality of phase synchronized coherent tone pairs as a seed source and to output a first modulated data stream, and a first receiver configured to receive the first modulated data stream from the first transmitter and receive the second unmodulated signal of the selected one of the plurality of phase synchronized coherent tone pairs as a local oscillator source.

In yet another aspect, an optical network communication system includes an optical hub including an optical frequency comb generator configured to output at least one phase synchronized coherent tone pair having a first unmodulated signal and a second unmodulated signal, and a downstream transmitter configured to receive the first unmodulated signal as a seed source and to output a downstream modulated data stream. The system further includes a fiber node and an end user including a downstream receiver configured to receive the downstream modulated data stream from the downstream transmitter and receive the second unmodulated signal as a local oscillator source.

In a still further aspect, a method of optical network processing includes steps of generating at least one pair of first and second unmodulated phase synchronized coherent tones, transmitting the first unmodulated phase synchronized coherent tone to a first transmitter as a seed signal, adhering downstream data, in the first transmitter, to the first unmodulated phase synchronized coherent tone to generate a first modulated data stream signal, optically multiplexing the first modulated data stream signal and the second unmodulated phase synchronized coherent tone together within a hub optical multiplexer, and communicating the multiplexed first modulated data stream signal and the second unmodulated phase synchronized coherent tone to a first receiver, by way of fiber optics, for downstream heterodyne detection.

In an aspect, an optical communication network includes an optical hub. The optical hub includes at least one master laser source and at least one hub transceiver configured to transmit a downstream signal of the at least one master laser source. The downstream signal includes a plurality of spaced wavelength channels. The network further includes an optical transport medium configured to carry the downstream signal from the optical hub, and a plurality of distributed modem devices operably coupled to the optical transport medium. The modem is (i) configured to receive at least one channel of the plurality of spaced wavelength channels, and (ii) including at least one child laser source injection locked to the master laser source.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
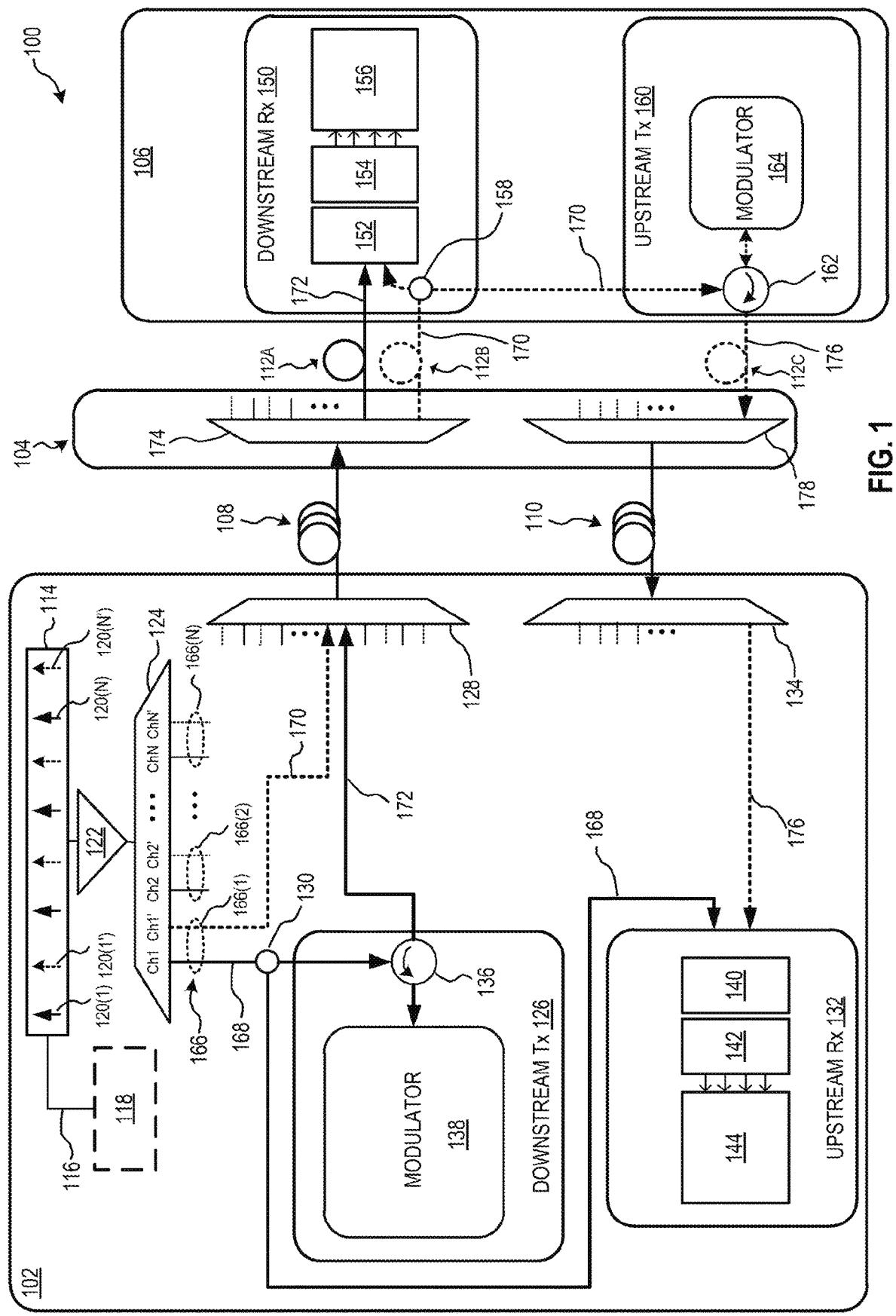
FIG. 1 is a schematic illustration of an exemplary fiber communication system in accordance with an exemplary embodiment of the present disclosure.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include computer program storage in memory for execution by personal computers, workstations, clients, and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events occur substantially instantaneously.

As used herein, "modem termination system" (MTS) refers to a termination unit including one or more of an Optical Network Terminal (ONT), an optical line termination (OLT), a network termination unit, a satellite termination unit, a cable modem termination system (CMTS), and/or other termination systems which may be individually or collectively referred to as an MTS.

As used herein, "modem" refers to a modem device, including one or more a cable modem (CM), a satellite modem, an optical network unit (ONU), a DSL unit, etc., which may be individually or collectively referred to as modems.

As described herein, a "PON" generally refers to a passive optical network or system having components labeled according to known naming conventions of similar elements that are used in conventional PON systems. For example, an OLT may be implemented at an aggregation point, such as a headend/hub, and multiple ONUs may be disposed and operable at a plurality of end user, customer premises, or subscriber locations. Accordingly, an "uplink transmission" refers to an upstream transmission from an end user to a headend/hub, and a "downlink transmission" refers to a downstream transmission from a headend/hub to the end user, which may be presumed to be generally broadcasting continuously (unless in a power saving mode, or the like).

FIG. 1 is a schematic illustration of an exemplary fiber communication system 100 in accordance with an exemplary embodiment of the present disclosure. System 100 includes an optical hub 102, a fiber node 104, and an end user 106. Optical hub 102 is, for example, a central office, a communications hub, or an optical line terminal (OLT). In the embodiment shown, fiber node 104 is illustrated for use with a passive optical network (PON). End user 106 is a downstream termination unit, which can represent, for example, a customer device, customer premises (e.g., an apartment building), a business user, or an optical network unit (ONU). In an exemplary embodiment, system 100 utilizes a coherent Dense Wavelength Division Multiplexing (DWDM) PON architecture.

Optical hub 102 communicates with fiber node 104 by way of downstream fiber 108. Optionally, where upstream communication is desired along system 100, optical hub 102 further connects with fiber node 104 by way of upstream fiber 110. In operation, downstream fiber 108 and upstream fiber 110 are typically 30 km or shorter. However, according to the embodiments presented herein, greater lengths are contemplated, such as between 100 km and 1000 km. In an exemplary embodiment, fiber node 104 connects with end user 106 by way of fiber optics 112. Alternatively, fiber node 104 and end user 106 may be integrated as a single device, such as a virtualized cable modem termination system (vCMTS), which may be located at a customer premises. Where fiber node 104 and end user 106 are separate devices, fiber optics 112 typically spans a distance of approximately 5000 feet or less.

Optical hub 102 includes an optical frequency comb generator 114, which is configured to receive a high quality source signal 116 from an external laser 118 and thereby generate multiple coherent tones 120(1), 120(1'), ... 120(N), 120(N'). Optical frequency comb generator 114 utilizes, for example, a mode-locked laser, a gain-switched laser, or electro-optic modulation, and is constructed such that multiple coherent tones 120 are generated as simultaneous low-linewidth wavelength channels of known and controllable spacing. This advantageous aspect of the upstream input signal into system 100 allows a simplified architecture throughout the entire downstream portion of system 100, as described further below.

Generated coherent tones 120 are fed into an amplifier 122, and the amplified signal therefrom is input into a first hub optical demultiplexer 124. In an exemplary embodiment, amplifier 122 is an erbium-doped fiber amplifier (EDFA). Optical hub 102 further includes a downstream transmitter 126 and a hub optical multiplexer 128. In an embodiment, optical hub 102 optionally includes a hub optical splitter 130, an upstream receiver 132, and a second hub optical demultiplexer 134.

Downstream transmitter 126 includes a downstream optical circulator 136 and a downstream modulator 138. In an exemplary embodiment, downstream modulator 138 is an injection locked laser modulator. Upstream receiver 132 includes an upstream integrated coherent receiver (ICR) 140, an upstream analog to digital converter (ADC) 142, and an upstream digital signal processor (DSP) 144. In the exemplary embodiment, fiber node 104 includes a node optical demultiplexer 146. In an alternative embodiment, where upstream transmission is desired, fiber node 104 further includes a node optical multiplexer 148. In the exemplary embodiment, node optical demultiplexer 146 and node optical multiplexer 148 are passive devices.

End user 106 further includes a downstream receiver 150. In an exemplary embodiment, downstream receiver 150 has a similar architecture to upstream receiver 132, and includes a downstream ICR 152, a downstream ADC 154, and a downstream DSP 156. For upstream transmission, end user 106 optionally includes end user optical splitter 158, which may be located within downstream receiver 150 or separately, and an upstream transmitter 160. In an exemplary embodiment, upstream transmitter 160 has a similar architecture to downstream transmitter 126, and includes an upstream optical circulator 162, and an upstream modulator 164.

In operation, system 100 utilizes optical frequency comb generator 114 and amplifier 122 convert the input high quality source signal 116 into multiple coherent tones 120 (e.g., 32 tones, 64 tones, etc.), which are then input to first hub optical demultiplexer 124. In an exemplary embodiment, high quality source signal 116 is of sufficient amplitude and a narrow bandwidth such that a selected longitudinal mode of signal 116 is transmitted into optical frequency comb generator 114 without adjacent longitudinal modes, which are suppressed prior to processing by comb generator 114. First hub optical demultiplexer 124 then outputs a plurality of phase synchronized coherent tone pairs 166(1), 166(2), ... 166(N). That is, the generated coherent frequency tones 120 are amplified by amplifier 122 to enhance optical power, and then demultiplexed into multiple separate individual phased synchronized coherent tone source pairs 166. For simplicity of discussion, the following description pertains only to coherent tone pair 166(1) corresponding to the synchronized pair signal for the first channel output, which includes a first unmodulated signal 168 for Ch1 and a second unmodulated signal 170 for Ch1', and their routing through system 100.

With source signal 116 of a high quality, narrow band, and substantially within a single longitudinal mode, coherent tone pair 166(1), including first unmodulated signal 168 (Ch1) and second unmodulated signal 170 (Ch1'), is output as a high quality, narrowband signal, which then serves as both a source of seed and local oscillator (LO) signals for both downstream and upstream transmission and reception directions of system 100. That is, by an exemplary configuration, the architecture of optical frequency comb generator 114 advantageously produces high quality continuous wave (CW) signals. Specifically, first unmodulated signal 168 (Ch1) may function as a downstream seed and upstream LO throughout system 100, while second unmodulated signal 170 (Ch1') concurrently may function as an upstream seed and downstream LO for system 100.

According to the exemplary embodiment, within optical hub 102, first unmodulated signal 168 (Ch1) is divided by hub optical splitter 130 and is separately input to both downstream transmitter 126 and upstream receiver 132 as a "pure" signal, and i.e., substantially low amplitude, narrow bandwidth continuous wave does not include adhered data. First unmodulated signal 168 (Ch1) thus becomes a seed signal for downstream transmitter 126 and an LO signal for upstream receiver 132. In an exemplary embodiment, within downstream transmitter 126, first unmodulated signal 168 (Ch1) passes through downstream optical circulator 136 into downstream modulator 138, in which one or more laser diodes (not shown in FIG. 1, described below with respect to FIGS. 2-5) are excited, and adhere data (also not shown in FIG. 1, described below with respect to FIGS. 2-5) to the signal that then exits downstream optical circulator 136 as downstream modulated data stream 172 (Ch1).

In an exemplary embodiment, downstream optical circulator 136 is within downstream transmitter 126. Alternatively, downstream optical circulator 136 may be physically located separately from downstream transmitter 126, or else within the confines of downstream modulator 138. Downstream modulated data stream 172 (Ch1) is then combined in hub optical multiplexer 128 with the plurality of modulated/unmodulated data stream pairs from other channels (not shown) and transmitted over downstream fiber 108, to a node optical demultiplexer 174 in fiber node 104, which then separates the different channel stream pairs for transmission to different respective end users 106. At end user 106, because the data stream pair 170, 172 entering downstream receiver 150 is phase synchronized, digital signal processing at downstream DSP 156 is greatly simplified, as described below with respect to FIG. 7.

Where upstream reception is optionally sought at optical hub 102, second unmodulated signal 170 (Ch1') is divided, within end user 106, by end user optical splitter 158 and is separately input to both downstream receiver 150 and upstream transmitter 160 as a "pure" unmodulated signal for Ch1'. In this alternative embodiment, second unmodulated signal 170 (Ch1') thus functions a seed signal for upstream transmitter 160 and a "pseudo LO signal" for downstream receiver 150 for the coherent detection of Ch1. For purposes of this discussion, second unmodulated signal 170 (Ch1') is referred to as a "pseudo LO signal" because it uses an LO signal from a remote source (output from first hub optical demultiplexer 124), and is not required to produce an LO signal locally at end user 106. This particular configuration further significantly reduces cost and complexity of the architecture of the system 100 by the reduction of necessary electronic components.

For upstream transmission, in an exemplary embodiment, a similar coherent detection scheme is implemented for upstream transmitter 160 as is utilized for downstream transmitter 126. That is, second unmodulated signal 170 (Ch1') is input to upstream optical circulator 162 and modulated by upstream modulator 164 to adhere symmetric or asymmetric data (not shown, described below with respect to FIG. 6) utilizing one or more slave lasers (also not shown, described below with respect to FIG. 6), and then output as an upstream modulated data stream 176 (Ch1'), which is then combined with similar modulated data streams from other channels (not shown) by a node multiplexer 178 in fiber node 104. Second unmodulated signal 170 (Ch1') is then transmitted upstream over upstream fiber 110, separated from other channel signals by second hub optical demultiplexer 134, an input to upstream receiver 132, for simplified digital signal processing similar to the process described above with respect to downstream receiver 150.

By this exemplary configuration, multiple upstream channels from different end users 106 can be multiplexed at fiber node 104 (or a remote node) and sent back to optical hub 102. Thus, within optical hub 102, the same coherent detection scheme may be used at upstream receiver 132 as is used with downstream receiver 150, except that upstream receiver 132 utilizes first unmodulated signal 168 (Ch1) as the LO and upstream modulated data stream 176 (Ch1') to carry data, whereas downstream receiver 150 utilizes the data stream pair (Ch1, Ch1') in reverse. That is, downstream receiver 150 utilizes second unmodulated signal 170 (Ch1') as the LO and downstream modulated data stream 172 (Ch1) to carry data.

Implementation of the embodiments described herein are useful for migrating hybrid fiber-coaxial (HFC) architectures towards other types of fiber architectures, as well as deeper fiber architectures. Typical HFC architectures tend to have very few fiber strands available from fiber node to hub (e.g. fibers 108, 110), but many fiber strands could be deployed to cover the shorter distances that are typical from legacy HFC nodes to end users (e.g., fiber optics 112). In the exemplary embodiments described herein, two fibers (i.e., fibers 108, 110) are illustrated between optical hub 102 and fiber node 104, which can be a legacy HFC fiber node. That is, one fiber (i.e., downstream fiber 108) is utilized for downstream signal and upstream seed/downstream LO, and another fiber (i.e., upstream fiber 110) is utilized for upstream signal. Additionally, three fibers (i.e., fiber optics 112A-C) are illustrated for each end user from fiber node 104 (e.g., legacy HFC fiber node) to end user 106. By utilization of the advantageous configurations herein, fiber deeper or all-fiber migration schemes can utilize an HFC fiber node as an optical fiber distribution node, thereby greatly minimizing the need for fiber retrenching from an HFC node to an optical hub.

The architecture described herein, by avoiding the need for conventional compensation hardware, can therefore be structured as a significantly less expensive and more compact physical device than conventional devices. This novel and advantageous system and subsystem arrangement allows for multi-wavelength emission with simplicity, reliability, and low cost. Implementation of optical frequency comb generator 114, with high quality input source signal 116, further allows simultaneous control of multiple sources that are not realized by conventional discrete lasers. According to the embodiments herein, channel spacing, for example, may be 25 GHz, 12.5 GHz, or 6.25 GHz, based on available signal bandwidth occupancy.

The embodiments described herein realize still further advantages by utilizing a comb generator (i.e., optical frequency comb generator 114) that maintains a constant wavelength spacing, thereby avoiding optical beat interference (OBI) that may be prevalent in cases with simultaneous transmissions over a single fiber. In the exemplary embodiment illustrated in FIG. 1, fiber node 104 is shown as a passive system, and is thus expected to maintain a higher reliability than other migration approaches. Nevertheless, one of ordinary skill in the art, after reading and comprehending present application, will understand how the embodiments disclosed herein may also be adapted to a remote PHY solution, or to a remote CMTS that is included in the fiber node.

As illustrated and described herein, system 100 may utilize an architecture of coherent DWDM-PON incorporate novel solutions to meet the unique requirements of access environment, but with cost-efficient structures not seen in conventional hardware systems. Optical frequency comb generator 114 produces a plurality of simultaneous narrow width wavelength channels with controlled spacing, thereby allowing simplified tuning of the entire wavelength comb. This centralized comb light source in optical hub 102 therefore provides master seeding sources and LO signals for both downstream and upstream directions in heterodyne detection configurations in order to reuse the optical sources throughout the entirety of system 100. This advantageous configuration realizes significant cost savings and reduction in hardware complexity over intradyne detection schemes in long-haul systems, for example.

Figure 2:
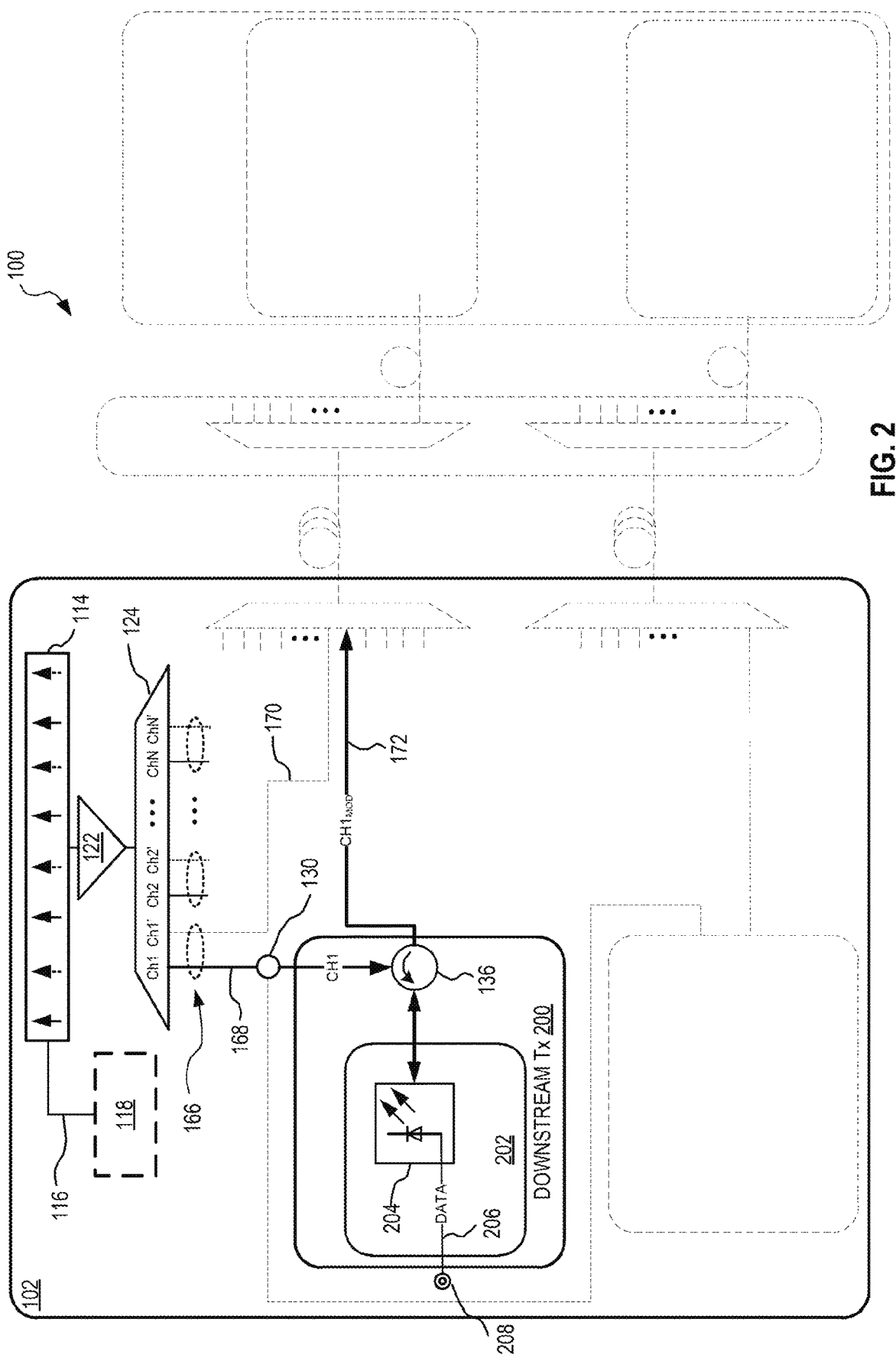
FIG. 2 is a schematic illustration depicting an exemplary transmitter that can be utilized with the fiber communication system depicted in FIG. 1.

FIG. 2 is a schematic illustration depicting an exemplary downstream transmitter 200 that can be utilized with fiber communication system 100, depicted in FIG. 1. Downstream transmitter 200 includes downstream optical circulator 136 (see FIG. 1, above) in two-way communication with a laser injected modulator 202, which includes a laser diode 204, which receives data 206 from an external data source 208. In an alternative embodiment, downstream transmitter 200 may include two separate fiber receivers (not shown), which would substitute, and eliminate the need, for downstream optical circulator 136 in the structural configuration shown.

In operation, downstream transmitter 200 performs the same general functions as downstream transmitter 126 (FIG. 1, described above). Laser injected modulator 202 utilizes laser diode 204 as a "slave laser." That is, laser diode 204 is injection locked by external laser 118, which functions as a single frequency or longitudinal mode master, or seed, laser to keep the frequency of a resonator mode of laser diode 204 close enough to the frequency of the master laser (i.e., laser 118) to allow for frequency locking. The principle of downstream transmitter 200 is also referred to as "laser cloning," where a single high quality master laser (i.e., laser 118) transmits a narrow bandwidth, low noise signal (i.e., source signal 116), and a relatively inexpensive slave laser (e.g., laser diode 204) can be used throughout system 100 to transmit data modulated signals, such as downstream modulated data stream 172 (Ch1). In an exemplary embodiment, laser diode 204 is a Fabry Perot laser diode (FP LD), or a vertical-cavity surface-emitting laser (VCSEL), in comparison with the considerably more expensive distributed feedback laser diodes (DFB LD) that are conventionally used. In an alternative embodiment, laser diode 204 is an LED, which can perform as a sufficient slave laser source according to the embodiments herein due to the utilization of the high quality source signal 116 that is consistently utilized throughout system 100.

More specifically, first unmodulated signal 168 (Ch1) exiting hub optical splitter 130 is input to downstream optical circulator 136, which then excites laser diode 204, that is, laser diode 204 emits light at a specified modulation rate. Laser injected modulator 202 adheres data 206 to the excited Ch1 signal, and the resultant modulated Ch1 signal with adhered data is output from downstream optical circulator 136 as downstream modulated data stream 172 (Ch1). According to this exemplary embodiment, first unmodulated signal 168 (Ch1) is input to downstream transmitter 126 as an unmodulated, low amplitude, narrow bandwidth, low noise "pure" source, and is modulated by laser diode 204, which is a high amplitude, wide bandwidth device, and resultant downstream modulated data stream 172 (Ch1) is a high amplitude, narrow bandwidth, low noise "pure" signal that can be transmitted throughout system 100 without the need for further conventional compensation means (hardware and programming). Suppression of adjacent longitudinal modes from laser diode 204, for example, is not necessary because of the exciting source signal (i.e., signal 168) is of such high quality and narrow bandwidth that output downstream modulated data stream 172 (Ch1) is substantially amplified only within the narrow bandwidth of external laser 118. In the exemplary embodiment illustrated in FIG. 2, laser injected modulator 202 implements direct modulation.

Optical injection locking as described herein thus improves upon the performance of the relatively less expensive, multi-longitudinal slave laser source (i.e., laser diode 204) in terms of spectral bandwidth and noise properties. With respect to heterodyne coherent detection, incoming signals (upstream or downstream) can be combined with the LO or pseudo-LO and brought to an intermediate frequency (IF) for electronic processing. According to this exemplary configuration, part of the LO/pseudo-LO optical power can also be employed as the master/seed laser for the reverse transmission direction, at both optical hub 102, and at end user 106 (described below with respect to FIG. 6), and thus a fully coherent system having a master seed and LO delivery from an optical hub can be achieved in a relatively cost-effective manner comparison with conventional systems.

Figure 3:
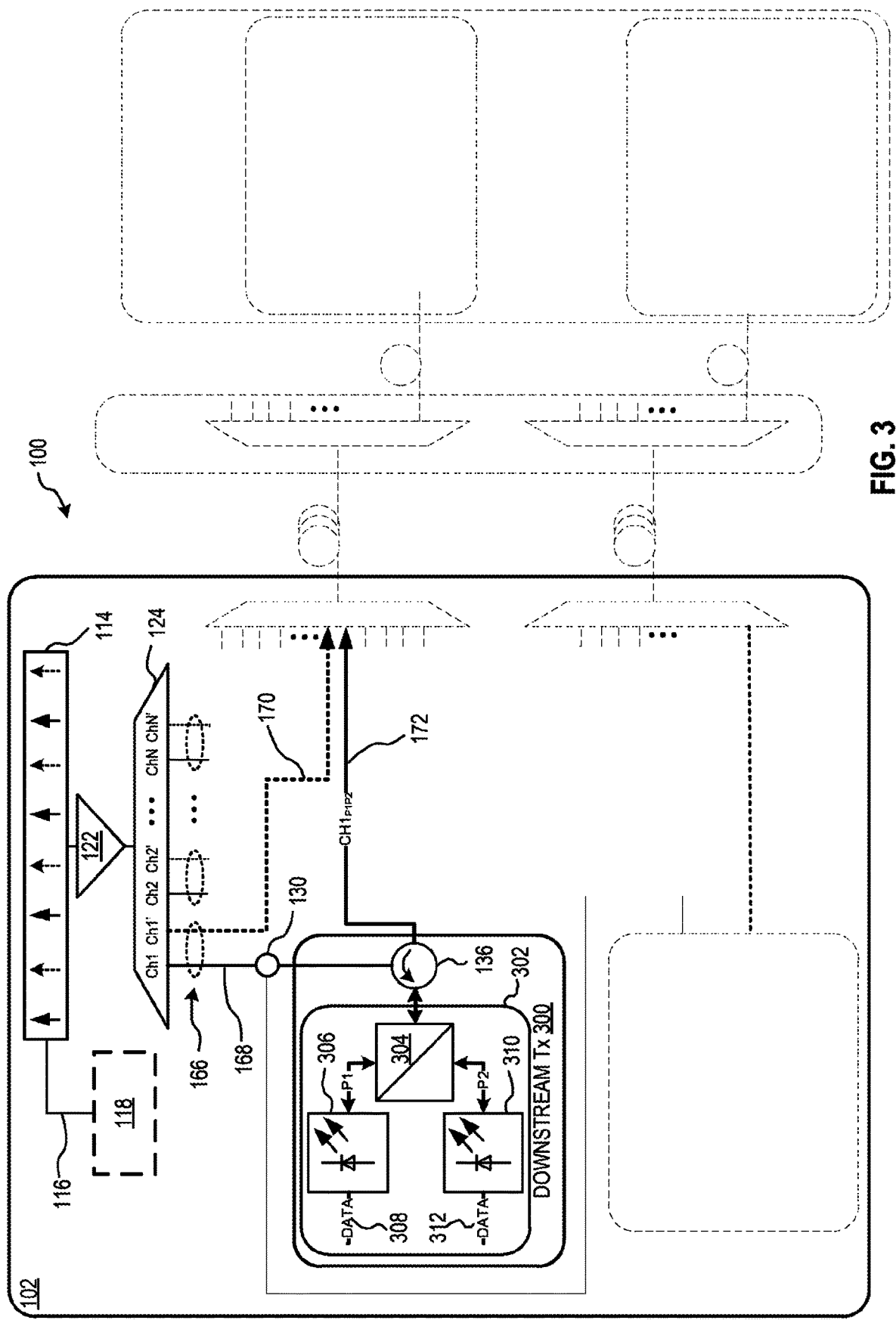
FIG. 3 is a schematic illustration depicting an alternative transmitter that can be utilized with the fiber communication system depicted in FIG. 1.

FIG. 3 is a schematic illustration depicting an alternative downstream transmitter 300 that can be utilized with fiber communication system 100, depicted in FIG. 1. Downstream transmitter 300 is similar to downstream transmitter 200 (FIG. 2), including the implementation of direct modulation, except that downstream transmitter 300 alternatively utilizes polarization division multiplexing to modulate the Ch1 signal into downstream modulated data stream 172 (Ch1).

Downstream transmitter 300 includes downstream optical circulator 136 (see FIG. 1, above) in two-way communication with a laser injected modulator 302, which includes a polarization beam splitter (PBS)/polarization beam combiner (PBC) 304, which can be a single device. Laser injected modulator 302 further includes a first laser diode 306 configured to receive first data 308 from an external data source (not shown in FIG. 3), and a second laser diode 310 configured to receive second data 312 from the same, or different, external data source.

In operation, downstream transmitter 300 is similar to downstream transmitter 200 with respect to the implementation of direct modulation, and master/slave laser injection locking. Downstream transmitter 300 though, alternatively implements dual-polarization from the splitter portion of PBS/PBC 304, which splits first unmodulated signal 168 (Ch1) into its x-polarization component P1 and y-polarization component P2, which separately excite first laser diode 306 and second laser diode 310, respectively. Similar to downstream transmitter 200 (FIG. 2), in downstream transmitter 300, first unmodulated signal 168 (Ch1) exiting hub optical splitter 130 is input to downstream optical circulator 136, the separate polarization components of which then excite laser diodes 306, 310, respectively, at the specified modulation rate. Laser injected modulator 302 adheres data first and second data 308, 312 to the respective excited polarization components of the Ch1 signal, which are combined by the combiner portion of PBS/PBC 304. The resultant modulated Ch1 signal with adhered data is output from downstream optical circulator 136 as downstream modulated data stream 172 (Ch1).

In an exemplary embodiment, the polarized light components received by first and second laser diodes 306, 310 are orthogonal (90 degrees and/or noninteractive). That is, first laser diode 306 and second laser diode 310 are optimized as slave lasers to lock onto the same wavelength as external laser 118 (master), but with perpendicular polarization directions. By this configuration, large data packets (e.g., first data 308 and second data 312) can be split and simultaneously sent along separate pathways before recombination as downstream modulated data stream 172 (Ch1). Alternatively, first data 308 and second data 312 may come from two (or more) separate unrelated sources. The orthogonal split prevents data interference between the polarized signal components. However, one of ordinary skill in the art will appreciate that, according to the embodiment of FIG. 3, first unmodulated signal 168 (Ch1) can also be polarized at 60 degrees, utilizing similar principles of amplitude and phase, as well as wavelength division. First unmodulated signal 168 (Ch1) can alternatively be multiplexed according to a spiral or vortex polarization, or orbital angular momentum. Additionally, whereas the illustrated embodiment features polarization multiplexing, space division multiplexing and mode division multiplexing may be also alternatively implemented.

According to this exemplary embodiment, master continuous wave signal for Ch1, namely, first unmodulated signal 168, is received from optical frequency comb generator 114 and is split to be used, in the first part, as the LO for upstream receiver 132, and in the second part, to synchronize two slave lasers (i.e., first laser diode 306 and second laser diode 310) by the respective x-polarization and y-polarization light portions such that both slave lasers oscillate according to the wavelength of the master laser (i.e., external laser 118). Data (i.e., first data 308 and second data 312) is directly modulated onto the two slave lasers, respectively. This injection locking technique thus further allows for frequency modulation (FM) noise spectrum control from the master laser to the slave laser, and is further able to realize significant improvements in FM noise/phase jitter suppression and emission linewidth reduction.

As described herein, utilization of optical injection with a dual-polarization optical transmitter (i.e., downstream transmitter 300) by direct modulation may advantageously implement relatively lower-cost lasers to perform the functions of conventional lasers that are considerably more costly. According to this configuration of a dual-polarization optical transmitter by direct modulation of semiconductor laser together with coherent detection, the present embodiments are particular useful for short-reach applications in terms of its lower cost and architectural compactness. Similar advantages may be realized for long reach applications.

Figure 4:
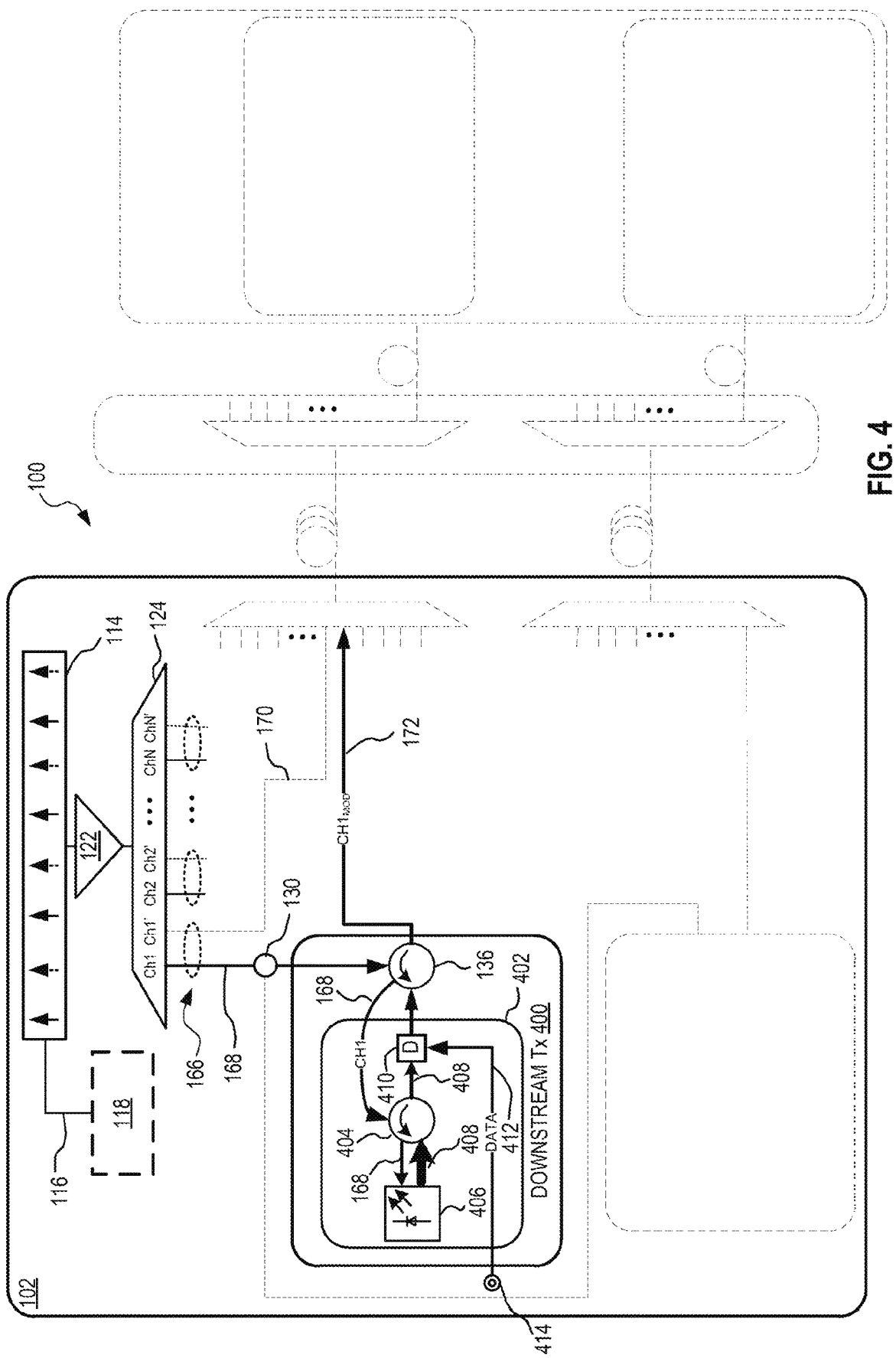
FIG. 4 is a schematic illustration depicting an alternative transmitter that can be utilized with the fiber communication system depicted in FIG. 1.

FIG. 4 is a schematic illustration depicting an alternative downstream transmitter 400 that can be utilized with fiber communication system 100, depicted in FIG. 1. Downstream transmitter 400 is similar to downstream transmitter 200 (FIG. 2), except that downstream transmitter 400 alternatively implements external modulation, as opposed to direct modulation, to modulate the Ch1 signal into downstream modulated data stream 172 (Ch1). Downstream transmitter 400 includes downstream optical circulator 136 (see FIG. 1, above) and a laser injected modulator 402. Downstream optical circulator 136 is in one-way direct communication with a separate external optical circulator 404 that may be contained within laser injected modulator 402 or separate. Laser injected modulator 402 further includes a laser diode 406, which receives the low amplitude, narrow bandwidth, first unmodulated signal 168 (Ch1) and emits an excited, high amplitude, narrow bandwidth, optical signal 408 back to external optical circulator 404. Laser injected modulator 402 still further includes an external modulating element 410, which receives data 412 from an external data source 414, and adheres data 412 with optical signal 408 to be unidirectionally received back by downstream optical circulator 136 and output as downstream modulated data stream 172 (Ch1).

In this exemplary embodiment, downstream transmitter 400 performs the same general functions as downstream transmitter 126 (FIG. 1, described above), but uses external modulation as the injection locking mechanism to lock laser diode 406 to the wavelength of the master laser source (e.g., external laser 118). To implement external modulation, this embodiment regulates optical signal flow through mostly unidirectional optical circulators (i.e., downstream optical circulator 136, external optical circulator 404). External modulating element 410 may optionally include a demultiplexing filter (not shown) as an integral component, or separately along the signal path of downstream modulated data stream 172 (Ch1) prior to input by downstream receiver 150. In an exemplary embodiment, external modulating element 410 is a monitor photodiode, and injection locking is performed through a rear laser facet.

Figure 5:
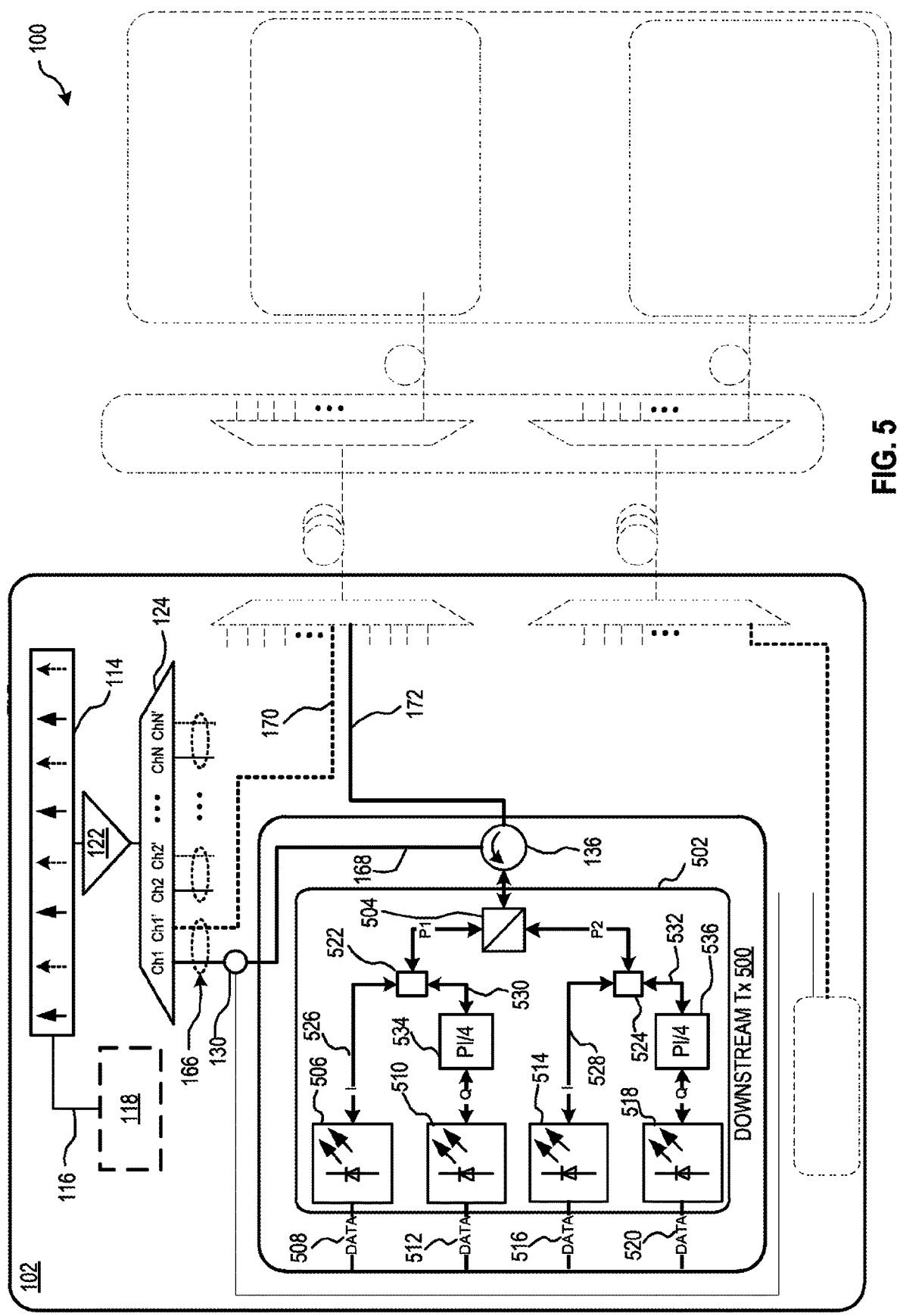
FIG. 5 is a schematic illustration depicting an alternative transmitter that can be utilized with the fiber communication system depicted in FIG. 1.

FIG. 5 is a schematic illustration depicting an alternative downstream 500 transmitter that can be utilized with fiber communication system 100, depicted in FIG. 1. Downstream transmitter 500 is similar to downstream transmitter 300 (FIG. 3), including the implementation of direct modulation and polarization division multiplexing, except that downstream transmitter 500 further implements quadrature amplitude modulation (QAM) to modulate the Ch1 signal into downstream modulated data stream 172 (Ch1). That is, further external modulating elements may be utilized per polarization branch (FIG. 2, above) to generate QAM signals.

Downstream transmitter 500 includes downstream optical circulator 136 (see FIG. 1, above) in two-way communication with a laser injected modulator 502, which includes a PBS/PBC 504, which can be a single device or two separate devices. Additionally, all of the components of laser injected modulator 502 may themselves be separate devices, or alternatively all contained within a single photonic chip. Laser injected modulator 502 further includes a first laser diode 506 configured to receive first data 508 from an external data source (not shown in FIG. 5), a second laser diode 510 configured to receive second data 512 from the same, or different, external data source, a third laser diode 514 configured to receive third data 516 from the same/different, external data source, and a fourth laser diode 518 configured to receive fourth data 520 from the same/different external data source.

In operation, downstream transmitter 500 implements dual-polarization from the splitter portion of PBS/PBC 504, which splits first unmodulated signal 168 (Ch1) into its x-polarization component (P1) and y-polarization component (P2). Each polarization component P1, P2 is then input to first non-polarized optical splitter/combiner 522 and second non-polarized optical splitter/combiner 524, respectively. First and second optical splitters/combiners 522, 524 each then further split their respective polarization components P1, P2 into their I-signals 526, 528, respectively, and also into their Q-signals 530, 532, respectively. Generated I-signals 526, 528 then directly excite laser diodes 506, 514, respectively. Before directly communicating with laser diodes 510, 518, respectively, generated Q-signals 530, 532 first pass through first and second quadrature phase shift elements 534, 536, respectively, each of which shifts the Q-signal by 45 degrees in each direction, such that the respective Q-signal is offset by 90 degrees from its respective I-signal when recombined at splitters/combiners 522, 524.

The resultant modulated Ch1 signal, with adhered data, is output from downstream optical circulator 136 of downstream transmitter 500 as downstream modulated data stream 172 (Ch1), and as a polarized, multiplexed QAM signal. According to this exemplary embodiment, utilization of a photonic integrated circuit allows for directly modulated polarization of a multiplexed coherent system, but utilizing significantly lower cost hardware configurations than are realized by conventional architectures. In an exemplary embodiment, laser diodes 506, 510, 514, 516 are PAM-4 modulated laser diodes capable of generating 16-QAM polarization multiplexed signals.

Figure 6:
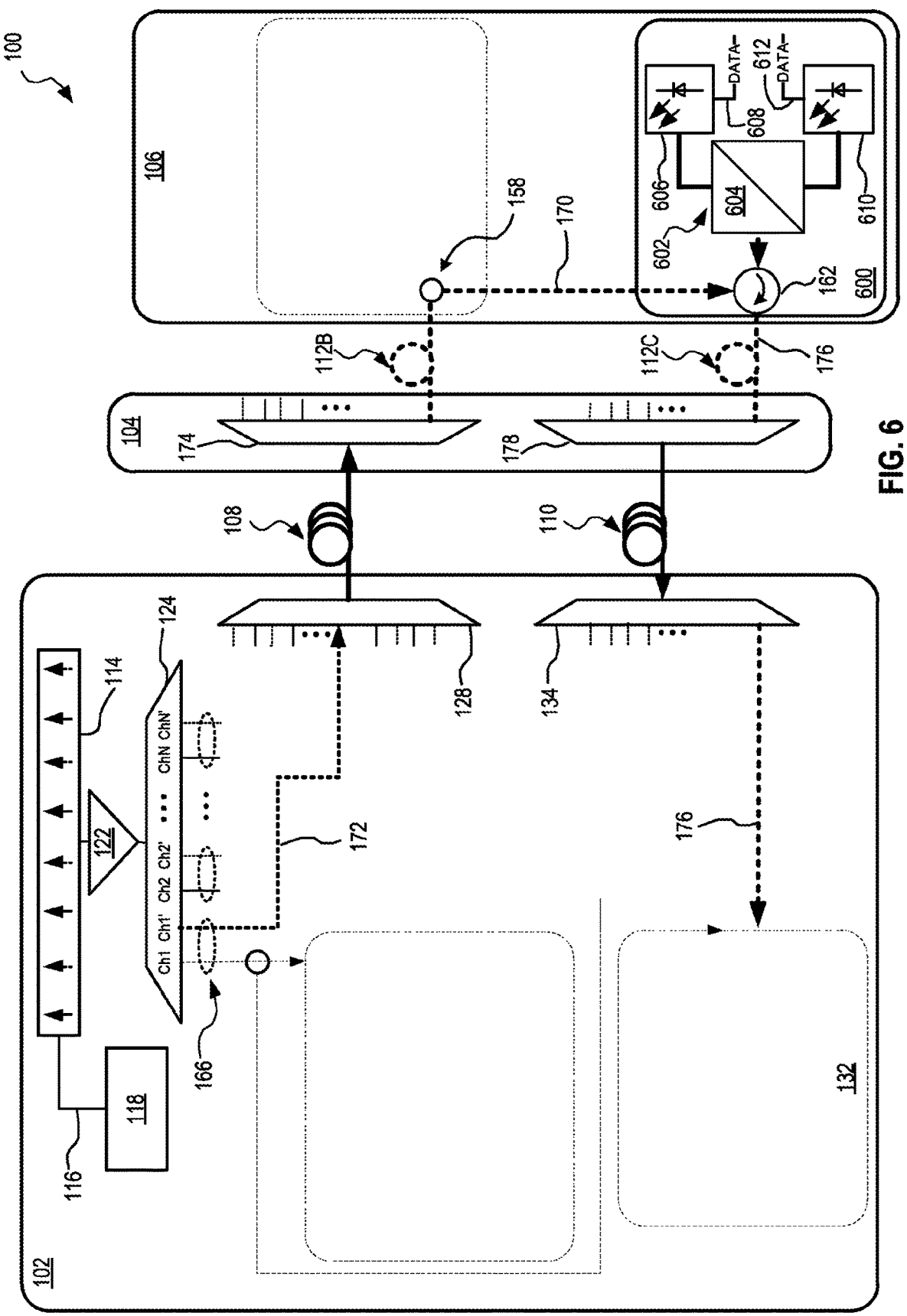
FIG. 6 is a schematic illustration depicting an exemplary upstream connection that can be utilized with the fiber communication system depicted in FIG. 1.

FIG. 6 is a schematic illustration depicting an exemplary upstream transmitter 600 that can be utilized with the fiber communication system 100, depicted in FIG. 1. In the embodiment illustrated in FIG. 6, upstream transmitter 600 is similar to downstream transmitter 300 (FIG. 3) in structure and function. Specifically, upstream transmitter 600 includes upstream optical circulator 162 (see FIG. 1, above) in two-way communication with a laser injected modulator 602 (not separately illustrated in FIG. 6), which includes a PBS/PBC 604, which can be a single device or separate devices. Laser injected modulator 602 further includes a first laser diode 606 configured to receive first data 608 from an external data source (not shown in FIG. 6), and a second laser diode 610 configured to receive second data 612 from the same, or different, external data source. Similar to the embodiments of FIGS. 2-5, above, downstream transmitter 600 may also eliminate for upstream optical circulator 162 by the utilization of at least two separate fiber receivers (not shown).

Upstream transmitter 600 is thus nearly identical to downstream transmitter 300 (FIG. 3), except that upstream transmitter 600 utilizes second unmodulated signal 170 (Ch1') as the end user seed source, in laser injected modulator 602, to combine or adhere with data (e.g., first data 608, second data 612) to generate upstream modulated data stream 176 (Ch1') to carry upstream data signals to an upstream receiver (e.g., upstream receiver 132). In operation, first laser diode 606 and second laser diode 610 also function as slave lasers by injection locking to the master signal from external laser 118. That is, symmetric or asymmetric data for Ch1' (e.g., first data 608, second data 612) is modulated onto the two slave lasers (i.e., first laser diode 606 and second laser diode 610) with polarization multiplexing, much the same as the process implemented with respect to downstream transmitter 300 (FIG. 3) in optical hub 102.

In this example, upstream transmitter 600 is illustrated to substantially mimic the architecture of downstream transmitter 300 (FIG. 3). Alternatively, upstream transmitter 600 could equivalently mimic the architecture of one or more of downstream transmitters 200 (FIG. 2), 400 (FIG. 4), or 500 (FIG. 5) without departing from the scope of the present disclosure. Furthermore, upstream transmitter 600 can conform to any of the embodiments disclosed by FIGS. 2-5, irrespective of the specific architecture of the particular downstream transmitter utilized within optical hub 102. By utilization of high-quality, narrow bandwidth, low noise external laser source 118, the master/slave laser relationship carries through the entirety of system 100, and the plurality of end users 106 that receive modulated/unmodulated signal pairs (which may be 32, 64, 128, or as many as 256 from a single fiber line pair, e.g., downstream fiber 108 and upstream fiber 110).

The significant cost savings according to the present embodiments are thus best realized when considering that as many as 512 downstream transmitters (e.g., downstream transmitter 126, FIG. 1) and upstream transmitters (e.g., upstream transmitter 160, FIG. 1) may be necessary to fully implement all available chattel pairs from a single optical hub 102. The present embodiments implement a significantly lower cost and less complex hardware architecture to utilize the benefits accruing from implementation of high-quality external laser 118, without having to add expensive single longitudinal mode laser diodes, or other compensation hardware necessary to suppress adjacent longitudinal modes from inexpensive lasers or the noise components produced thereby.

Figure 7:
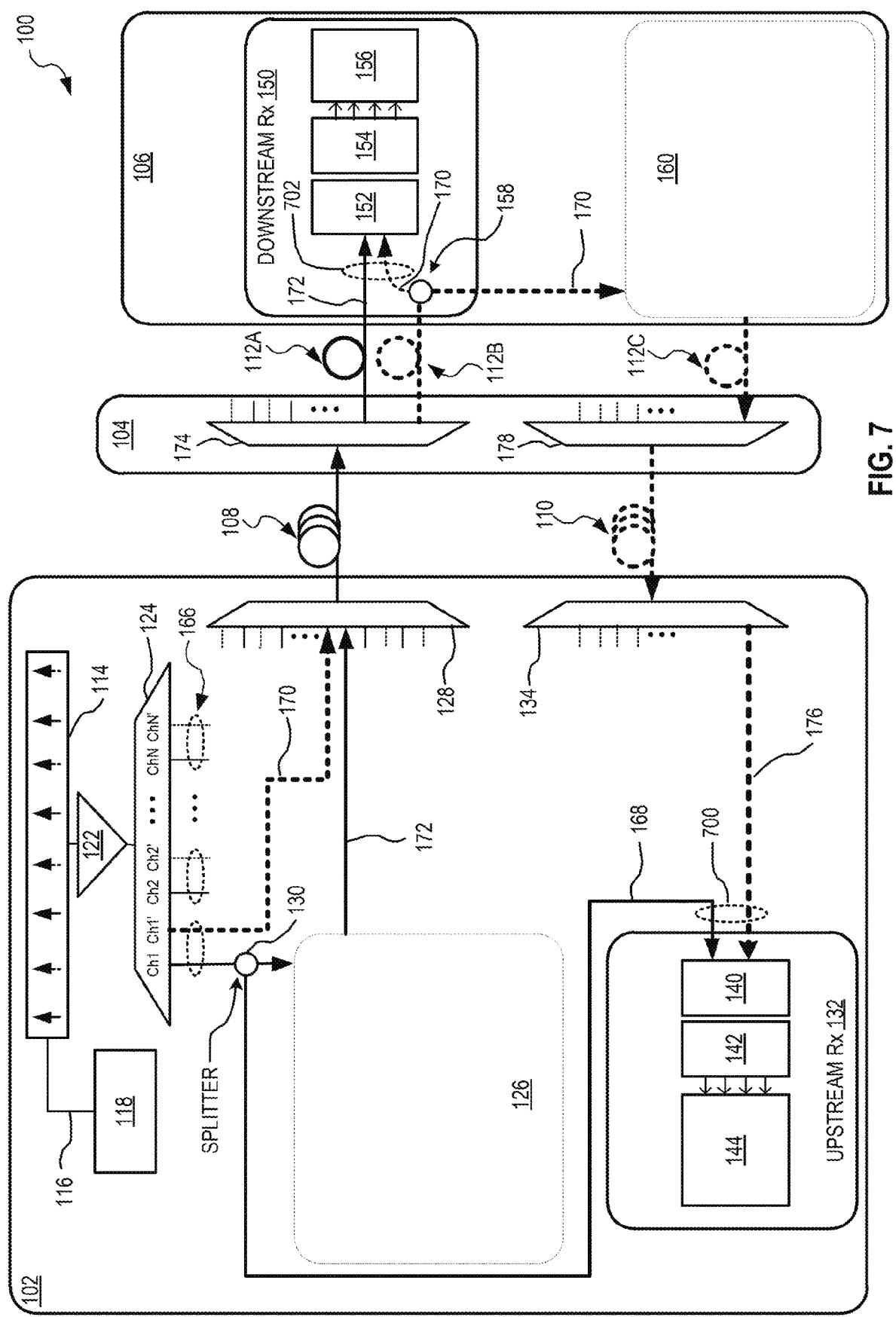
FIG. 7 is a schematic illustration depicting an exemplary processing architecture implemented with the fiber communication system depicted in FIG. 1.

FIG. 7 is a schematic illustration depicting an exemplary processing architecture which can be implemented for upstream receiver 132, downstream receiver 150, and fiber communication system 100, depicted in FIG. 1. The respective architectures of upstream receiver 132 and downstream receiver 150 are similar with respect to form and function (described above with respect to FIG. 1), except that upstream receiver 132 receives a first data stream pair 700 for Ch1, Ch1', in reverse of a second data stream pair 702, which is received by downstream receiver 150. In other words, as described above, first data stream pair 700 includes first unmodulated signal 168 (Ch1) as the LO and upstream modulated data stream 176 (Ch1') to carry data, whereas second data stream pair 702 includes unmodulated signal 170 (Ch1') as the LO and downstream modulated data stream 172 (Ch1) to carry data.

First and second data stream pairs 700, 702 the multiplexed phase synchronized pairs modulated/unmodulated of optical signals that are converted into analog electrical signals by ICR 140 and ICR 152, respectively. The respective analog signals are then converted into digital domain by ADC 142 and ADC 154, for digital signal processing by DSP 144 and DSP 156. In an exemplary embodiment, digital signal processing may be performed by a CMOS ASIC employing very large quantities of gate arrays. A conventional CMOS ASIC, for example, can utilize as many as 70 million gates to process incoming digitized data streams. In the conventional systems, modulated data streams for Ch1 and Ch1' are processed independently, which requires significant resources to estimate frequency offset, drift, and digital down conversion compensation factors (e.g., $e^{-j\omega t}$, where $\omega$ represents the frequency difference between first unmodulated signal 168 and upstream modulated data stream 176, and $\omega$ is held constant for coherent tone pair 166, as extended throughout system 100).

According to the exemplary embodiments disclosed herein, on the other hand, the modulated and unmodulated signals from Ch1 and Ch1' are phase synchronized together such that the difference between $\omega$ of the signal pair is always known, and phase synchronized to maintain a constant relationship. In contrast, conventional systems are required to constantly estimate the carrier phase to compensate for factors such as draft which requires considerable processing resources, as discussed above. According to the present embodiments though, since Ch1 and Ch1' are synchronized together as first and second data stream pairs 700, 702, the offset $\omega$ between the pairs 700, 702 need not be estimated, since it may be instead easily derived by a simplified subtraction process in DSP 144 and DSP 156 because the signal pairs will drift together by the same amount in a constant relationship. By this advantageous configuration and process, digital signal processing by a CMOS ASIC can be performed utilizing as few as one million gates, thereby greatly improving the processing speed of the respective DSP, and/or reducing the number of physical chips required to perform the processing (or similarly increasing the amount of separate processing that may be performed by the same chip). At present, implementation of the embodiments described herein may improve downstream and upstream data transmission speeds by as much as 5000 times faster than conventional systems.

Figure 8:
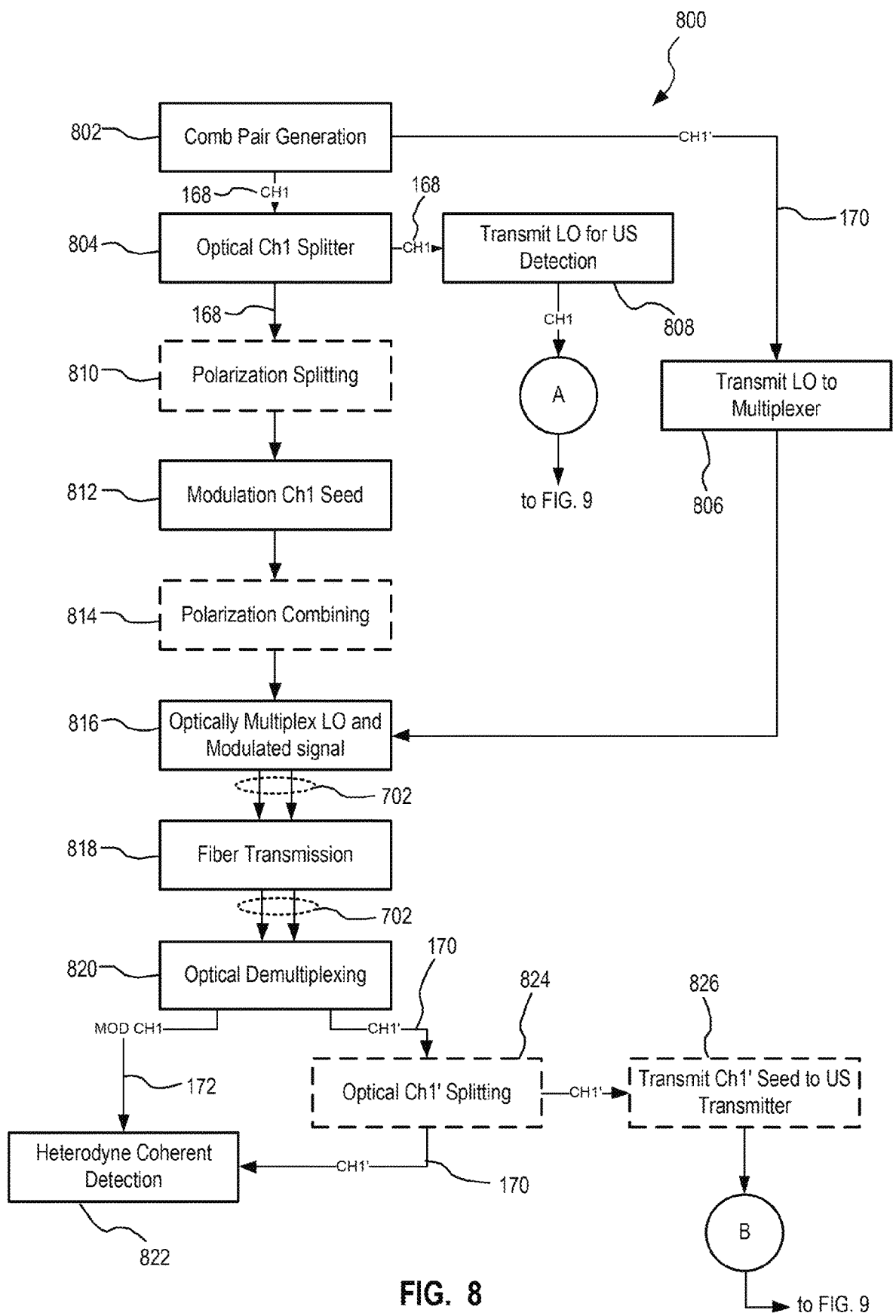
FIG. 8 is a flow chart diagram of an exemplary downstream optical network process.

FIG. 8 is a flow chart diagram of an exemplary downstream optical network process 800 that can be implemented with fiber communication system 100, depicted in FIG. 1. Process 800 begins at step 802. In step 802, coherent tone pairs 166 are generated and output by optical frequency comb generator 114, amplifier 122, and first hub optical demultiplexer 124. Similar to the discussion above, for simplification purposes, the following discussion addresses specific coherent tone pair 166(1) for Ch1, Ch1'. Coherent tone pair 166 includes first unmodulated signal 168 (Ch1) and second unmodulated signal 170 (Ch1'). Once coherent tone pair 166 is generated, process 800 proceeds from step 802 to steps 804 and 806, which may be performed together or simultaneously.

In step 804, first unmodulated signal 168 (Ch1) is input to an optical splitter, e.g., optical splitter 130, FIG. 1. In step 806, second unmodulated signal 170 (Ch1') is transmitted to a multiplexer, e.g., hub optical multiplexer 128, FIG. 1. Referring back to step 804, first unmodulated signal 168 (Ch1) is split to function both as an LO for upstream detection, and as a seed for downstream data transmission. For upstream detection, step 804 proceeds to step 808, where first unmodulated signal 168 (Ch1) is received by an upstream receiver, i.e., upstream receiver 132, FIG. 1. For downstream data transmission, step 804 separately and simultaneously proceeds to step 810.

Step 810 is an optional step, where polarization division multiplexing is desired. In step 810, first unmodulated signal 168 (Ch1) is split into its x-component and y-component parts P1, P2, respectively (e.g., by PBS/PBC 304, FIG. 3 or PBS/PBC 504, FIG. 5) for separate direct or external modulation. Where polarization division multiplexing is not utilized, process 800 skips step 810, and instead proceeds directly from step 804 to step 812. In step 812, first unmodulated signal 168 (Ch1), or its polarized components if optional step 810 is implemented, is modulated by direct (e.g., FIGS. 2, 3, 5) or external (e.g., FIG. 4) modulation. Process 800 then proceeds from step 812 to step 814. Step 814 is an optional step, which is implemented if optional step 810 is also implemented for polarization division multiplexing. In step 814, the x-component and y-component parts P1, P2 are recombined (e.g., by PBS/PBC 304, FIG. 3 or PBS/PBC 504, FIG. 5) for output as downstream modulated data stream 172 (Ch1). Where polarization division multiplexing was not utilized, process 800 skips step 814, and instead proceeds directly from step 812 to step 816.

In step 816, second unmodulated signal 170 (Ch1') and downstream modulated data stream 172 (Ch1) are optically multiplexed, i.e., by hub optical multiplexer 128, FIG. 1, as a phase synchronized data stream pair (e.g., second data stream pair 702, FIG. 7). Process 800 then proceeds from step 816 to step 818, where the phase synchronized data stream pair is transmitted over an optical fiber, i.e., downstream fiber 108, FIG. 1. Process 800 then proceeds from step 818 to step 820, where the synchronized data stream pair is optically demultiplexed, e.g., by node optical demultiplexer 174 in fiber node 104. Process 800 then proceeds from step 820 to step 822, where both components of the demultiplexed data stream pair (e.g., second unmodulated signal 170 (Ch1') and downstream modulated data stream 172 (Ch1)) are received by a downstream receiver (e.g., downstream receiver 150, FIG. 1) for heterodyne coherent detection.

Where an end user (e.g., end user 106) further includes upstream transmission capability, process 800 further includes optional steps 824 and 826. In step 824, and prior to downstream reception in step 822, second unmodulated signal 170 (Ch1') is optically split (e.g., by end user optical splitter 158, FIG. 1), and additionally transmitted, in step 826, to an upstream transmitter of the end user (e.g., upstream transmitter 160, FIG. 1) as a seed signal for a modulator (e.g., modulator 164, FIG. 1) for upstream data transmission, as explained further below with respect to FIG. 9.

Figure 9:
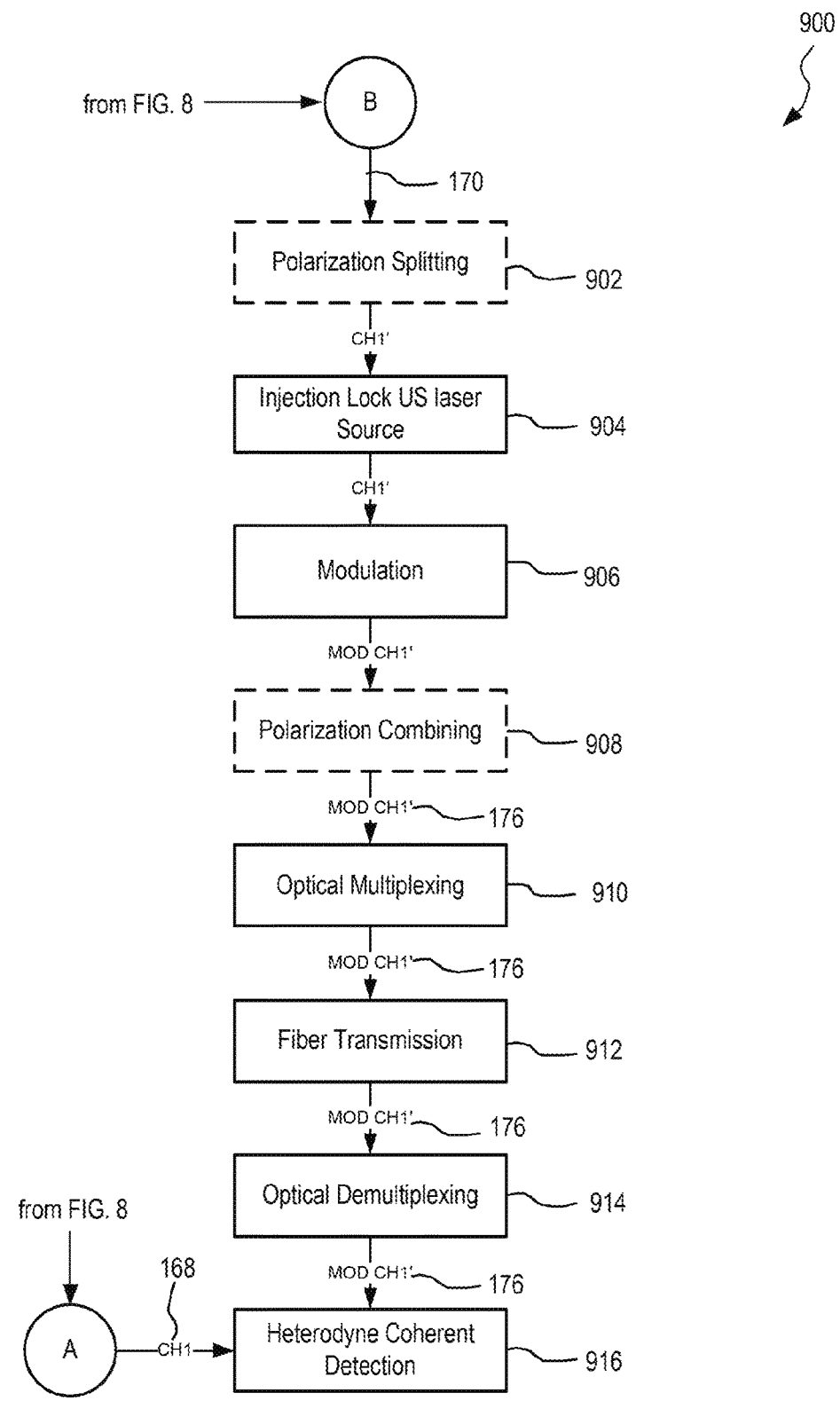
FIG. 9 is a flow chart diagram of an exemplary upstream optical network process that can be implemented with the downstream process depicted in FIG. 8.

FIG. 9 is a flow chart diagram of an exemplary upstream optical network process 900 that can be optionally implemented with fiber communication system 100, depicted in FIG. 1. Process 900 begins at optional step 902. In step 902, where polarization division multiplexing is utilized in the upstream transmitter (e.g., upstream transmitter 160, FIG. 1), second unmodulated signal 170 (Ch1') (from step 826, FIG. 8) is split into its x-component and y-component parts (e.g., by PBS/PBC 604, FIG. 6) for separate direct or external modulation. Where polarization division multiplexing is not utilized, step 902 is skipped, and process 900 instead begins at step 904.

In step 904, second unmodulated signal 170 (Ch1'), or its polarized components if optional step 902 is implemented, is injection locked to the master source laser (e.g., external laser 118, FIG. 1), as described above with respect to FIGS. 1 and 6. Step 904 then proceeds to step 906, where injection locked signal is modulated by direct or external modulation. Process 900 then proceeds from step 906 to step 908. Step 908 is an optional step, which is implemented if optional step 902 is also implemented for polarization division multiplexing. In step 908, the x-component and y-component parts of the excited Ch1' signal are recombined (e.g., by PBS/PBC 604, FIG. 6) for output as upstream modulated data stream 176 (Ch1'). Where polarization division multiplexing was not utilized, process 900 skips step 908, and instead proceeds directly from step 906 to step 910.

In step 910, upstream modulated data stream 176 (Ch1') is optically multiplexed, i.e., by node optical multiplexer 178, FIG. 1, with other upstream data stream signals (not shown). Process 900 then proceeds from step 910 to step 912, where upstream modulated data stream 176 (Ch1') is transmitted over an optical fiber, i.e., upstream fiber 110, FIG. 1. Process 900 then proceeds from step 912 to step 914, where upstream modulated data stream 176 (Ch1') is optically demultiplexed, e.g., by second hub optical demultiplexer 134, which separates the selected data stream from the other upstream data stream signals, for transmission to a particular upstream receiver tuned to receive the modulated data stream. Process 900 then proceeds from step 914 to step 916, where both components (e.g., first unmodulated signal 168 (Ch1), FIG. 8, and upstream modulated data stream 176 (Ch1')) of the upstream data stream pair, e.g., first data stream pair 700, FIG. 7, are received by an upstream receiver (e.g., upstream receiver and 32, FIG. 1) for heterodyne coherent detection.

As illustrated in the exemplary embodiment, a difference between upstream and downstream signal transmission is that an entire synchronized modulated/unmodulated channel pair (e.g., second data stream pair 702, FIG. 7) can be transmitted in the downstream direction, whereas, in the upstream direction, only a data modulated signal (e.g., upstream modulated data stream 176 (Ch1')) to be transmitted over the upstream fiber connection, i.e., upstream fiber 110. An advantage of the present configuration is that the LO for upstream coherent detection (e.g., at upstream receiver 132, FIG. 1) comes directly from the split signal, i.e., first unmodulated signal 168 (Ch1) generated from optical frequency comb generator 114 within optical hub 102, after separation by first hub optical demultiplexer 124, as depicted in FIG. 1. Conventional systems typically require LO generation at each stage of the respective system. According to the present disclosure, on the other hand, relatively inexpensive slave lasers can be implemented throughout the system architecture for modulation and polarization multiplexing in both optical hub 102 and end user 106 components, without requiring an additional LO source at the end user.

According to the present disclosure, utilization of dual-polarization optical transmitters, and by direct modulation of semiconductor lasers with coherent detection, is particularly beneficial for not only longhaul applications, but also for shortreach applications to reduce the cost of electronic hardware, while also rendering the overall network system architecture more compact. The present systems and methods further solve the conventional problem of synchronizing two laser sources over a long period of time. Utilization of the phase synchronized data stream pairs and slave lasers herein allows continual synchronization of the various laser sources throughout the system during its entire operation. These solutions can be implemented within coherent DWDM-PON system architectures for access networks in a cost-efficient manner.

Utilization of the high quality optical comb source at the front end of the system thus further allows a plurality of simultaneous narrow bandwidth wavelength channels to be generated with easily controlled spacing, and therefore also simplified tuning of the entire wavelength comb. This centralized comb light source in the optical hub provides master seeding sources and LO signals that can be reused throughout the system, and for both downstream and upstream transmission. The implementation of optical injection, as described herein, further improves the performance of low-cost multi-longitudinal slave laser sources in terms of spectral bandwidth and noise properties. Access networks according to the present systems and methods thus achieve more efficient transmission of wavelengths through optical fibers, thereby increasing the capacity of transmitted data, but at lower power, increased sensitivity, lower hardware cost, and a reduction in dispersion, DSP compensation, and error correction.

Injection Locking Systems and Methods

As described above, the innovative access network architectures of the present embodiments that implement coherent optics technology form the foundation of achieving transport speeds of 100G and beyond in the access network paradigm. The coherent modulation schemes described above advantageously enable an access network to drive down cost and complexity due to the spectral efficiency of coherent optics technology, as well as the management simplicity of the present systems and methods.

In a typical access network, much of the cost per bit of the network is fixed (e.g., by the fiber, line systems, facilities, management system, etc.), and largely independent of the data rate. Thus, the cost per bit in the access network will be most significantly lowered by achieving a higher data rate. In a practical implementation of the embodiments described above, the present inventors have already achieved a single-direction capacity of over 8,000 Gb/s on a single fiber, which represents approximately 5,000 times the capacity of access networks employing analog optics technology. This capacity is projected to increase to approximately 25,000 Gb/s per fiber within the next year, 50,000 Gb/s within the following few years, and greater within the next decade. However, the bulk of the capacity improvements has been primarily directed toward P2P configurations; conventional direct detection techniques have not been designed to reach residential end users in their homes.

The following systems and methods describe further improvements to the novel coherent PON (CPON) embodiments, described above, that implement injection locking technology from a master laser source. In exemplary embodiments, the present injection locking techniques may be implemented with respect to a master laser source generating a plurality of distinct coherent CW signals, or with respect to a master laser source generating a plurality of phase synchronized coherent tone pairs for each wavelength (e.g., phased synchronized coherent tone source pairs 166, FIG. 1).

In an exemplary embodiment, a novel CPON architecture implements optical injection locking technology that results in a significant reduction to the structural cost and operational complexity of an ONU. In some embodiments, homodyne detection techniques are implemented at the ONU utilizing downlink signals for both a master laser and a local oscillator. In other embodiments, heterodyne detection techniques are implemented at the ONU using remote delivery for the master laser and the local oscillator. According to these innovative the methods, the present CPON configurations advantageously overcome the significant limitations of the conventional direct detection systems described above.

Figure 10:
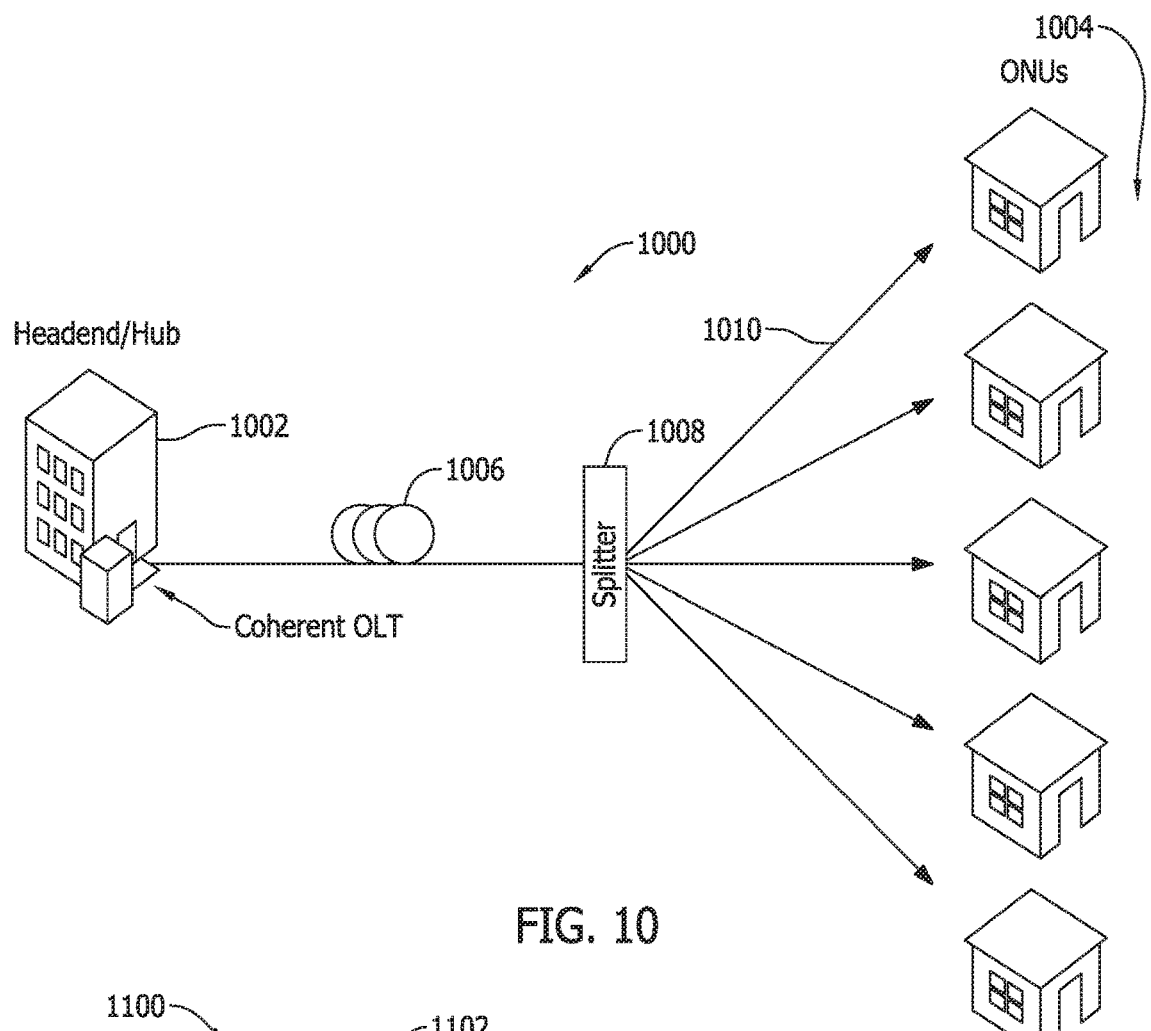
FIG. 10 is a schematic illustration of a point to multipoint coherent passive optical network.

FIG. 10 is a schematic illustration of a P2MP CPON 1000. In an exemplary embodiment, P2MP CPON 1000 includes a headend/hub 1002 in operable communicative coupling with a plurality of end users 1004 over a transport medium 1006. In this example, headend/hub 1002 may represent a central office, and may additionally include at least one coherent OLT as the MTS thereof. In a similar manner, one or more of end users 1004 may represent a residential home subscriber, and may include a separate ONU as the modem thereof at each respective residential location. Additionally in this example, transport medium 1006 may be an optical fiber having a length of 80 km, and configured to transport data at a 120 Gb/s capacity.

In an embodiment, CPON 1000 may be a coherent optical network configured to transmit a downstream coherent optical signal over transport medium 1006, from headend/hub 1002 to a splitter 1008, which splits the downstream coherent optical signal into a plurality of optical wavelengths, for further transport, over a plurality of short fibers 1010, to respective ONUs of end users 1004. In this example, the OLT of headend/hub 1002 may include at least one downstream coherent optical transmitter (not separately shown), and each ONU of an end-user 1004 may include a counterpart downstream coherent optical receiver. In an embodiment, splitter 1008 may represent one or more of an optical combiner, an optical splitter, a wavelength multiplexer, a wavelength demultiplexer, an optical coupler, and/or combinations thereof.

In a practical implementation of P2MP CPON 1000, the present inventors have successfully demonstrated a 120 Gb/s capacity, shared among 512 subscriber end users 1004, per wavelength over 80 km of fiber 1006. The present embodiments therefore realize significant improvements to the downstream portion of the CPON solution, thereby providing a technically feasible approach for both an extended reach, and also an ultra-high split ratio, for beyond the target 100G data rate capacity.

More particularly, the downstream solutions described herein have been successfully proven to advantageously increase the downstream capacity reach and split ratio, and for both conventional communication networks as well as emerging full duplex coherent optical systems (i.e., simultaneous bidirectional communication over the same fiber and same wavelength through coherent optics technology). The present systems and methods further advantageously enable full utilization of a novel coherent upstream burst transceiver, as well as all of the coherent optics injection locking techniques described herein, both individually and in combination, while also providing for use of a significantly low-cost laser at the customer premises of an end user. The novel coherent upstream burst transceiver is the subject of different application, whereas the following embodiments focus in greater detail on customer premises equipment, such as the ONU, which represents one of the most cost-sensitive portions of the network. As described further below, the systems and methods herein advantageously enable the use of significantly less expensive lasers that simplify the coherent transceiver configuration, which results in an ultra-low cost coherent transceiver that is relatively affordable for implementation at each subscriber residential home location, in comparison with conventional direct detection communication systems.

Figure 11:
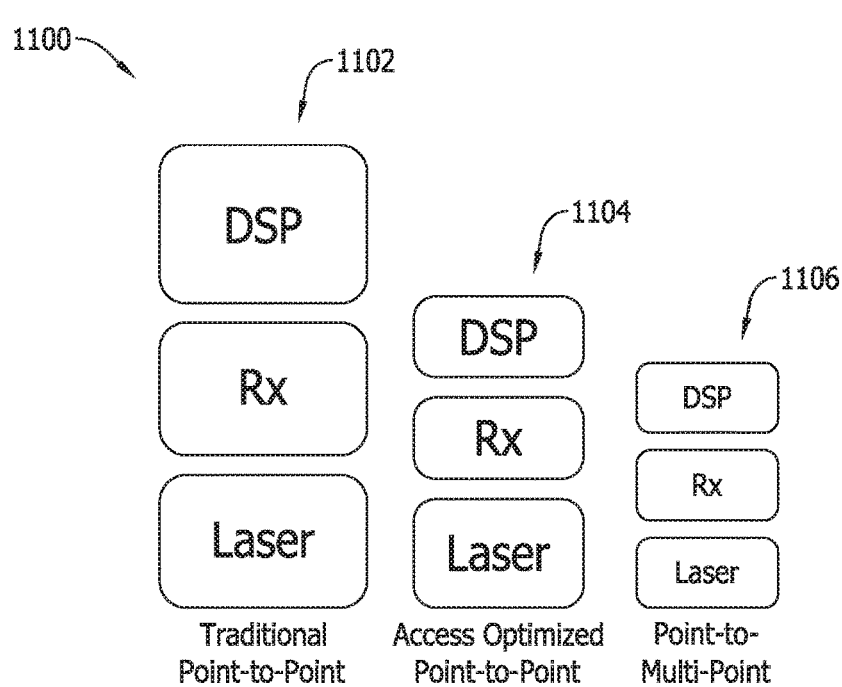
FIG. 11 depicts a comparative distribution between the present embodiments and conventional systems with respect to relative cost and complexity of structural components and algorithms.

FIG. 11 depicts a comparative distribution 1100 between the present embodiments and conventional systems with respect to relative cost and complexity of structural components and algorithms. More specifically, although not specifically shown to scale, comparative distribution 1100 illustrates the relative cost and complexity of the various DSP, receiver (RX), and laser hardware/software between a conventional P2P PON system 1102, and optimized access P2P PON system 1104, and a P2MP CPON system 1106 (e.g., P2MP CPON 1000, FIG. 10). In an exemplary embodiment, comparative distribution 1100 represents the relative cost and complexity improvements with respect to conventional long haul and metro transceivers, in particular with respect to minimization of DSP complexity, and simplification and cost reduction of the receiver.

Nevertheless, reduction of the cost and complexity of the laser source has been a significant challenge to conventional solutions. As described above, high-quality laser sources are known, but are too expensive to be practically implemented at the location of each end user in a coherent P2MP network. The following embodiments thus demonstrate an innovative solution for inexpensively providing a high-quality, less complex, laser source at each downstream receiver/upstream transmitter of an end user (e.g., the ONU).

Figure 12A:
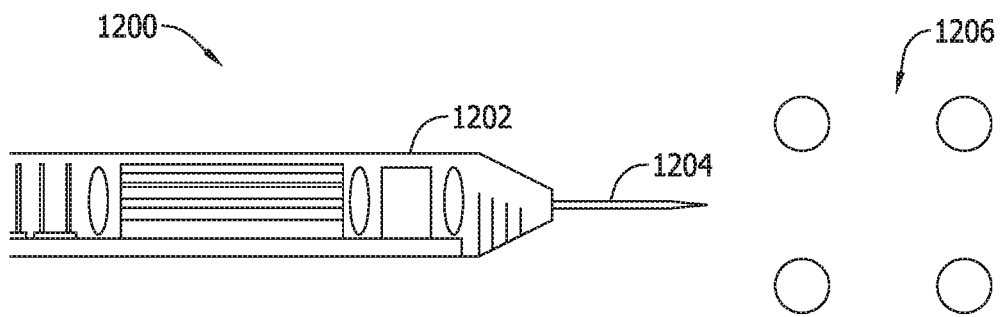
FIG. 12A depicts an exemplary use case of an external cavity laser source.

FIG. 12A depicts an exemplary use case of an ECL laser source 1200. In an embodiment, ECL laser source 1200 includes an ECL laser 1202 configured to generate an optical source output beam 1204 having a narrow linewidth, and exhibiting a distribution pattern 1206 having relatively low noise. In this example, ECL laser 1202 may be a conventional, high-quality ECL laser having a very narrow linewidth and significantly low noise output, i.e., in comparison with known lower-quality lasers having wide linewidths and more noise. The quality of laser sources is an important factor in the implementation of coherent optical transmission systems. However, as described above, high-quality lasers, such as ECL laser 1202, are prohibitively expensive for home-based solutions. At present, a conventional ECL laser cost approximately $1500 US.

Figure 12B:
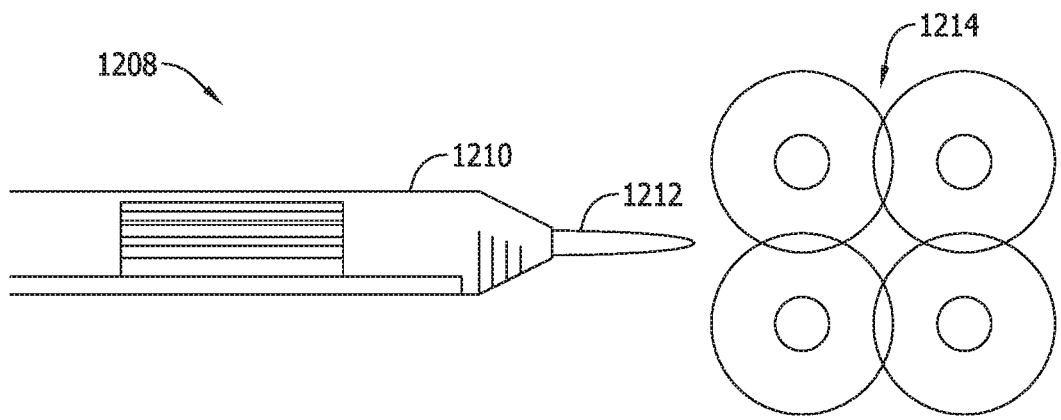
FIG. 12B depicts an exemplary use case of a Fabry-Perot laser source.

FIG. 12B depicts an exemplary use case of a FP laser source 1208. More particularly, in an embodiment, FP laser source 1208 includes an FP laser 1210 configured to generate an optical source output beam 1212 having a significantly wider linewidth and a distribution pattern 1214 exhibiting significantly more noise (i.e., in comparison with output beam 1204 of ECL laser 1202, FIG. 12A). As described above, the relatively low-cost FP lasers are significantly more affordable and less complex than the high-quality laser sources required for present coherent optics implementations. Prior to the prevalence of coherent optics technology, FP lasers were commonly used in upstream transmissions of HFC deployments, but have not been applicable to present-day coherent optical systems. According to the present systems and methods though, these previously inapplicable low-cost laser sources are effectively transformed into significantly higher-performing lasers, but without significantly increasing the cost of such implementations beyond where the deployment is economically infeasible for home use. This solution is described further below with respect to FIG. 12C.

Figure 12C:
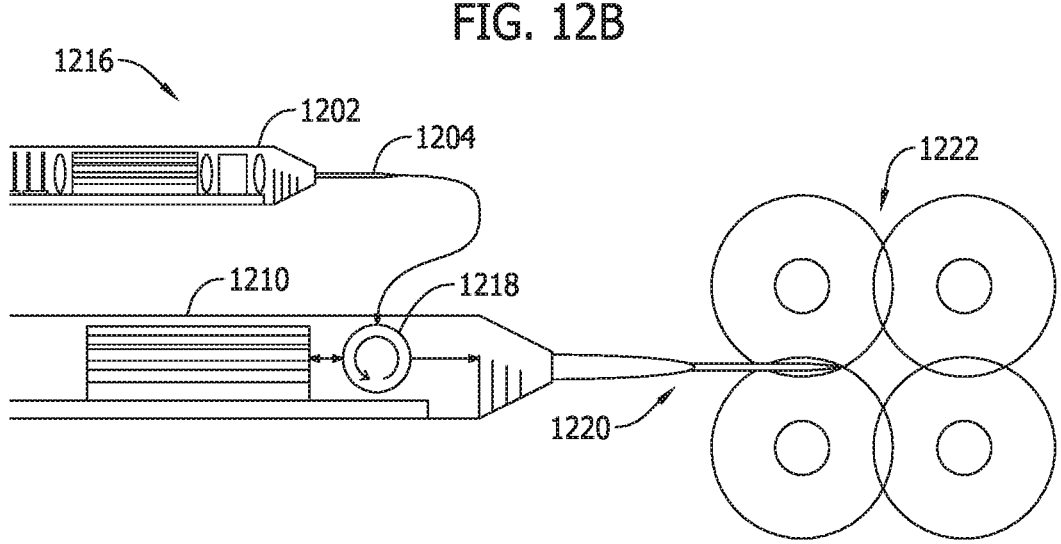
FIG. 12C depicts an exemplary hybrid system for injection locking the external cavity laser source depicted in FIG. 12A into the Fabry-Perot laser source depicted in FIG. 12B.

FIG. 12C depicts an exemplary hybrid system 1216 for injection locking ECL laser source 1200, FIG. 12A, into FP laser source 1208, FIG. 12B. More specifically, in an exemplary embodiment, hybrid system 1216 employs a novel coherent optical injection locking (COIL) technique to effectively "clone" the expensive, high quality, high performance of a single laser source (e.g., ECL laser source 1200) onto a plurality of relatively very basic and simpler lasers (e.g., FP laser source 1208). An exemplary operation of the injection locking process, high-quality laser 1202 (relatively expensive) generates high-quality optical source 1204, which is injected into FP laser 1210 through an optical circulator 1218. Through this optical injection process, the optical characteristics of the expensive ECL laser 1202 transfers to and output optical source 1220 of the considerably less expensive FP laser 1210. Output optical source 1220 this includes the frequency and linewidth of optical source 1204, which may then be readily utilized from an apparently "noisy" distribution pattern 1222, as important factors for the coherent system utilizing this COIL technique.

According to the hybrid solution depicted in FIG. 12C, the cost of the cloned optical source is effectively reduced (i.e., in comparison with the high-quality optical source being cloned) by approximately 200 times. In the exemplary embodiment, high-quality laser 1202 remains at the hub location (e.g., headend/hub 1002, FIG. 10), and this remote signal may then be shared/transmitted to many customer premise locations where a cloned laser source is deployed (described further below with respect to FIG. 13). Through this injection locking technique, each low-cost laser 1210 behaves like expensive laser 1202, but only one expensive laser 1202 is needed to implement this COIL technique for many low-cost lasers 1210 in a single P2MP network.

Accordingly, utilizing this COIL technique, the cost of expensive laser 1202 may be shared among and buying the many end users. In this example, in the case of 512 end users for a single expensive (i.e., approximately $1500 US) laser 1202, the expense of deploying an individual low-cost laser 1210 for each end user is approximately $40 US per residential home location implementing COIL. This cloning technique therefore represents a drastic cost saving solution over the deployment of an individual high-quality laser 1202 at each home location (i.e., not utilizing this COIL technique). In this example, the total cost of providing a coherent laser source at each individual home location includes the individual cost of cloned FP laser 1210, together with a the respective shared portion of the costs of parent laser 1202 and optical circulator 1218. The cost-per-home utilizing this COIL technique is thus in the approximate range of conventional direct detection PON systems. Accordingly, through the present systems and methods, coherent technology that is presently available to P2P network business users, may be affordably provided to residential subscribers in a P2MP network. An exemplary merger of such P2P and P2MP services is illustrated further below with respect to FIG. 13.

Figure 13:
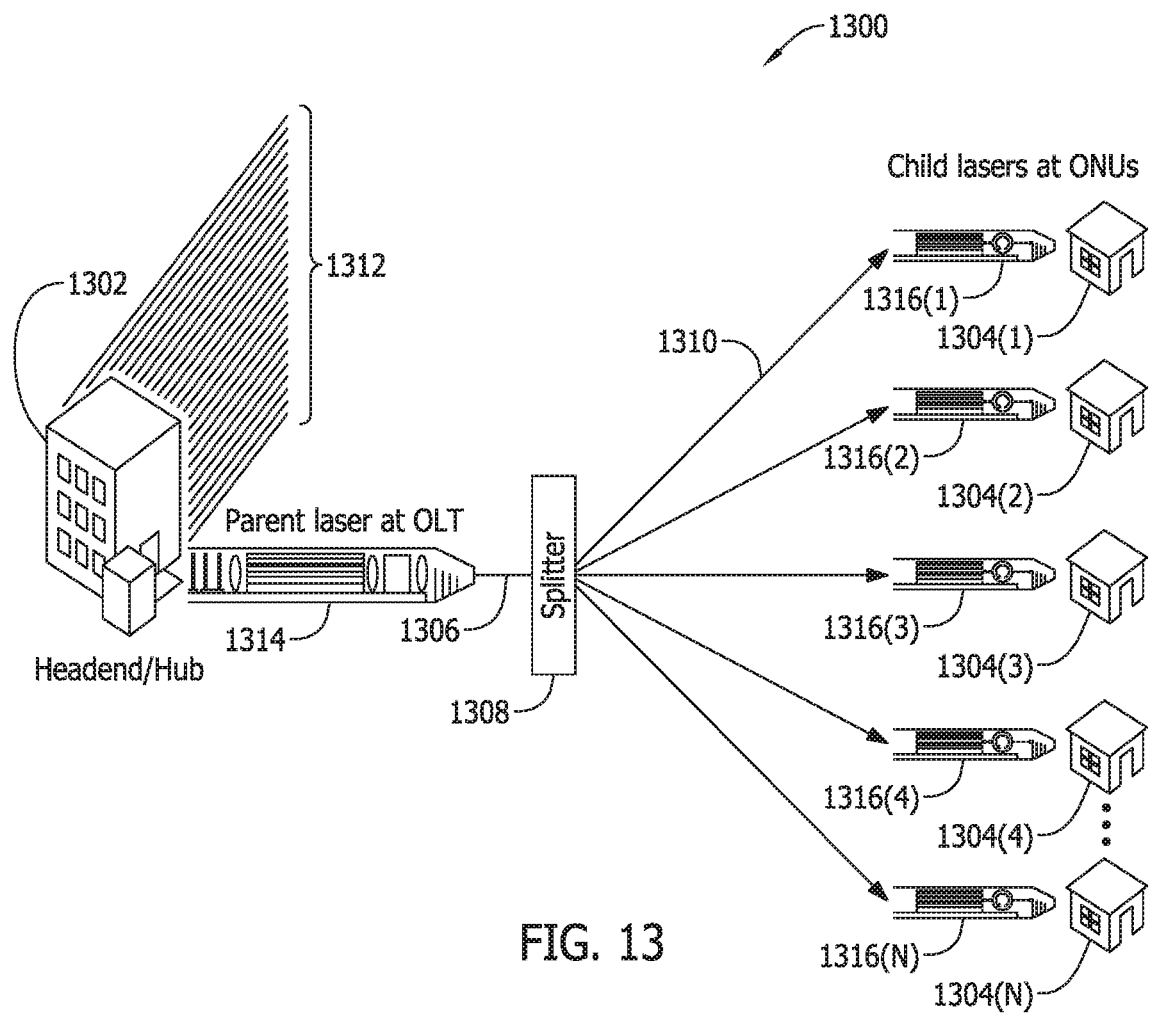
FIG. 13 is a schematic illustration of an injection locked point to multipoint coherent passive optical network.

FIG. 13 is a schematic illustration of an injection locked P2MP CPON 1300. P2MP CPON 1300 is similar in several aspects to P2MP CPON 1000, FIG. 10, and similarly-labeled elements thereof may be generally considered to have a substantially similar structure and or function. For example, similar to P2MP CPON 1000, P2MP CPON 1300 includes a headend/hub 1302 in operable communication with a plurality of end users 1304 over a transport medium/long fiber 1306, which connects to a splitter 1308 that splits the downstream coherent optical signal into a plurality of optical wavelengths for transport to respective ONUs of end users 1304 over a plurality of short fibers 1310.

Different though, from P2MP CPON 1000, in an exemplary embodiment, P2MP CPON 1300 is further configured such that a plurality of P2P fibers 1312 are communicatively coupled with headend/hub 1302 which includes at least one parent laser source 1314 at an MTS (e.g., the OLT) thereof. Accordingly, each end user 1304 further includes at least one child laser source 1316 at a modem (e.g., the ONU) thereof, and configured for injection locking with parent laser source 1314 according to the COIL techniques described above. According to this exemplary P2MP configuration, 100G coherent optical technology services, which have been heretofore only financially within the reach of P2P business subscribers, may now be provided to residential homes at a greatly reduced price that is competitive with conventional direct detection PON schemes.

As illustrated in FIG. 13, the cloning techniques of the present injection locking approach not only improves the P2MP paradigm, where a single source (e.g., headend/hub 1302) is transmitted to multiple destinations (e.g., end users 1304), but also provides a unique capability to the reverse case, namely, multiple sources (e.g., P2P fibers 1312) to a single destination (e.g., headend/hub 1302). Accordingly, in the near term, the injection locking technology of the present systems and methods it is further capable of reducing by at least 20 percent the cost of a P2P coherent link to a node in the Distributed Access paradigm. Thus, the overall cost of coherent optics deployment is significantly reduced throughout the several access paradigms, but without sacrificing delivery speed.

Further implementations of the present injection locking systems and methods are described further below with respect to FIGS. 14-24, and more specifically with respect to operation at a downlink coherent optical transceiver. In the following embodiments, the downlink coherent optical transceiver is described, for ease of explanation, to be an ONU. Nevertheless, the person of ordinary skill in the art will appreciate that the innovative techniques of the present embodiments are applicable to other receivers, transceivers, and/or modems, and are further applicable to uplink coherent optical transceiver configurations, as also described above.

Figure 14:
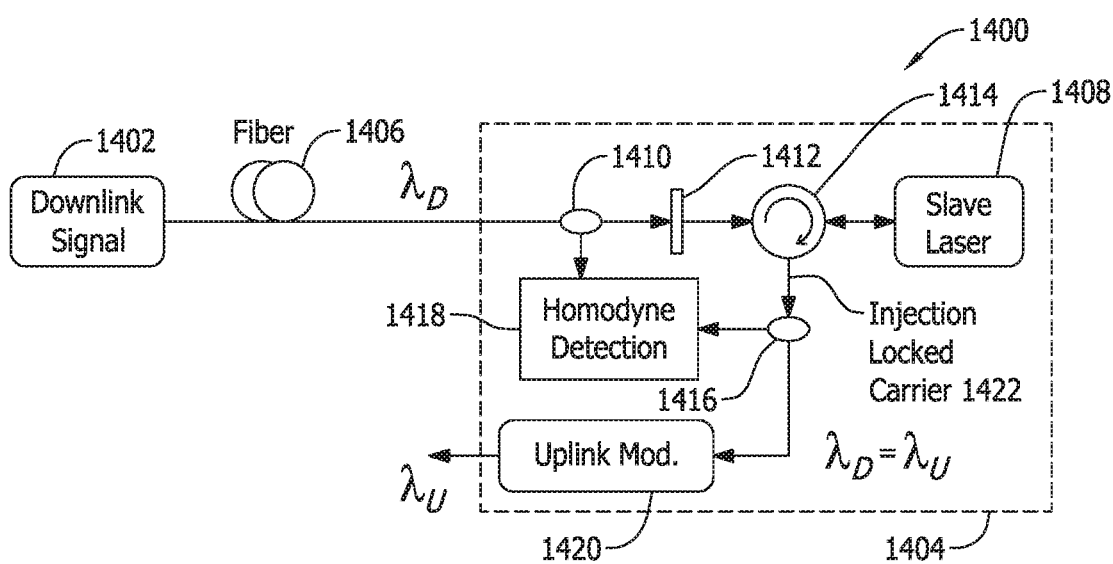
FIG. 14 is a schematic illustration of an exemplary passive optical network system implementing homodyne detection.

FIG. 14 is a schematic illustration of an exemplary PON system 1400 implementing homodyne detection. In an exemplary embodiment, system 1400 represents a CPON configured to implement COIL-based homodyne detection, and includes a downlink signal 1402 from a high quality parent/master laser source, which is transmitted as a downstream coherent wavelength $\lambda_D$ to an ONU 1404 over an optical fiber 1406. In an embodiment, ONU 1404 includes a slave laser 1408 and one or more of a first splitter 1410, and optical filter 1412, an optical circulator 1414, a second splitter 1416, a homodyne detection unit 1418, and an uplink modulator 1420 configured to output a modulated wavelength $\lambda_U$. In an exemplary embodiment, system 1400 may be implemented at the end user location of one or more of the respective systems described above, and downstream coherent wavelength $\lambda_D$ serves as downlink signal 1402 for both the master source and the LO.

In exemplary operation of system 1400, for the downlink, the received signal $\lambda_D$ is split by first splitter 1410 (e.g., a 3-dB optical coupler) with one arm thereof fed directly to homodyne detection unit 1418 (i.e., the downlink coherent receiver), and the other arm filtered first through optical filter 1412 (e.g., a narrow optical filter) and then injected, through optical circulator 1414 (e.g., a 3-port optical circulator), into the low-cost laser source of slave laser 1408. In the exemplary embodiment, optical filter 1412 is configured such that master laser power is sufficiently balanced with the narrow width of striped signal bandwidth.

After injection locking with slave laser 1408, the newly injected signal of a resultant injection locked carrier signal 1422 is split by second splitter 1416 (e.g., a 3-dB splitter), with one arm thereof returned to homodyne detection unit/receiver 1418 as the LO with phase noise and carrier frequency offset removed. According to this configuration, homodyne detection unit 1418 is advantageously capable of achieving carrier recovery in the optical domain without any delay. The other arm from second splitter 1416 is sent to uplink modulator 1422 become the uplink optical source of upstream modulated wavelength $\lambda_U$, which may be communicated upstream by way of a full duplex coherent optical connection schemes using an optical circulator (e.g., FIGS. 15-16, below), or realized by a dedicated separate, second fiber (e.g., FIG. 17, below).

In an embodiment, in the case of asymmetrical modulation, the upstream transmission may employ an intensity modulation scheme, such as a non-return to zero on-off keying (NRZ-OOK) format, instead of the coherent modulation scheme implemented for the downstream transmission. According to the advantageous configuration of system 1400, only one relatively low-cost slave laser (e.g., an FP laser source) need be employed at each ONU 1404 to realize the effective performance of the high-cost master laser (e.g., an ECL laser source). In the exemplary embodiment, no carrier recovery is then needed in the relevant DSP flow either.

Figure 15:
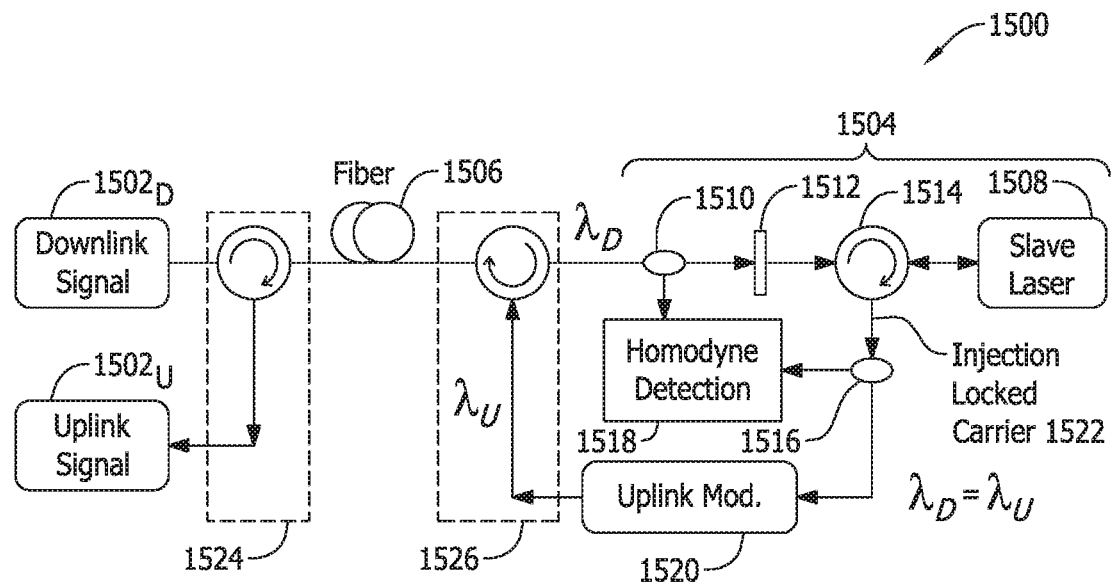
FIG. 15 is a schematic illustration of an exemplary passive optical network system implementing homodyne detection in a full duplex operation.

FIG. 15 is a schematic illustration of an exemplary PON system 1500 implementing homodyne detection in a full duplex operation. In an exemplary embodiment, system 1500 represents a CPON configured to implement COIL-based homodyne detection, in a substantially similar manner to system 1400, FIG. 14, and includes a downlink signal $1502_D$ from a high quality parent/master laser source, which is transmitted as a downstream coherent wavelength $\lambda_D$ to an ONU 1504 over an optical fiber 1506. In an embodiment, ONU 1504 includes a slave laser 1508 and one or more of a first splitter 1510, an optical filter 1512, an ONU optical circulator 1514, a second splitter 1516, a homodyne detection unit/receiver 1518, and an uplink modulator 1520 configured to output a modulated upstream wavelength $\lambda_U$ from an injection locked carrier signal 1522. In an exemplary embodiment, system 1500 may be implemented at the end user location one or more of the respective systems described above, and downstream coherent wavelength $\lambda_D$ again may serve as downlink signal $1502_D$ for both the master source and the LO.

In exemplary operation, system 1500 performs similarly to system 1400 with respect to the reception and processing of downlink signal $1502_D$ by ONU 1504. Different though, from the embodiment depicted in FIG. 14, system 1500 further includes a hub optical circulator 1524 disposed at the end of fiber 1506 that couples with the headend/hub (not shown in FIG. 15), and an end user optical circulator 1526 disposed at the other end of fiber 1506 that couples with ONU 1504.

In an exemplary embodiment, both of hub optical circulator 1524 and end user optical circulator 1526 are 3-port optical circulators respectively disposed on either side of the uplink and the downlink. In further exemplary operation, at the hub location, downlink signal $1502_D$ by is transmitted from port 1 to port 2 of hub optical circulator 1524, and an uplink signal $1502_U$ is transmitted from port 2 to port 3 of hub optical circulator 1524. Similarly, at the end point location of ONU 1504, downlink signal $1502_D$ by is transmitted from port 2 to port 3 of end point optical circulator 1526, and the modulated uplink signal $1502_U$ is transmitted from port 1 to port 2 of end point optical circulator 1526.

In the exemplary embodiment of system 1500, to achieve the full benefit of the bidirectional full duplex scheme, coherent modulation is also implemented for the upstream transmission. The bidirectional coherent signals provide significantly higher optical signal to noise ratio (OSNR) sensitivity, and also higher tolerance to the impairments from spontaneous Rayleigh backscattering, in comparison with non-coherent, intensity-modulated systems. Additionally, according to the configuration of system 1500, the threshold of the stimulated Brillouin scattering (SBS) nonlinear effect is much higher because of the nature of phase-modulated signals on the reduction of optical carrier power and the increase of effective linewidth.

Figure 16:
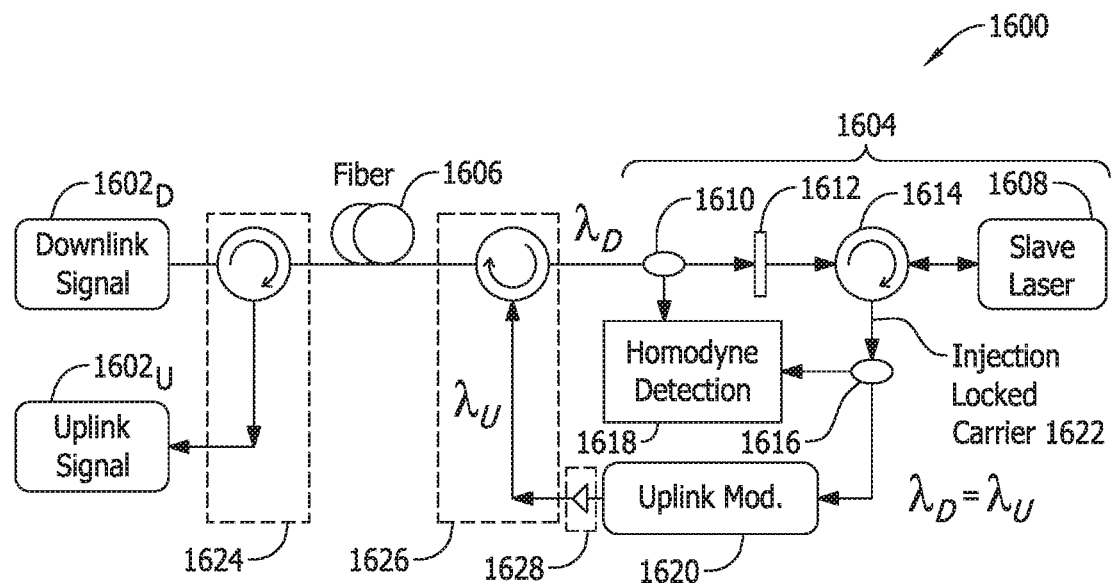
FIG. 16 is a schematic illustration of an exemplary passive optical network system implementing homodyne detection in a full duplex operation.

FIG. 16 is a schematic illustration of an exemplary PON system 1600 implementing homodyne detection in a full duplex operation. In an exemplary embodiment, system 1600 represents a CPON configured to implement COIL-based homodyne detection, in a substantially similar manner to system 1500, FIG. 15, and similarly includes a downlink signal $1602_D$ from a high quality parent/master laser source, transmitted as a downstream coherent wavelength $\lambda_D$, to an ONU 1604 over an optical fiber 1606, and further includes a slave laser 1608, a first splitter 1610, an optical filter 1612, an ONU optical circulator 1614, a second splitter 1616, a homodyne detection unit/receiver 1618, an uplink modulator 1620 configured to output a modulated upstream wavelength $\lambda_U$ from an injection locked carrier signal 1622, a hub optical circulator 1624 disposed at the end of fiber 1606 that couples with the headend/hub (not shown in FIG. 16), and an end user optical circulator 1626 disposed at the other end of fiber 1606 that couples with ONU 1604.

Different from system 1500 though, system 1600 further includes a semiconductor optical amplifier (SOA) 1628 disposed at the location of ONU 1604. In the exemplary embodiment, SOA 1628 is disposed along the path of modulated upstream wavelength $\lambda_U$ between uplink modulator 1620 and end user optical circulator 1626. In an embodiment, SOA may have a similar structure to an FP laser diode (e.g., slave laser 1608), but will not function as a laser source. Although SOAs generally have higher noise than an EDFA, the low noise output achieved by cloning slave laser 1608 to perform as the master laser enables system 1600 to implement SOA 1628 in place of a traditional EDFA because noise is much less of a factor in this particular COIL-based full duplex bidirectional coherent system.

Figure 17:
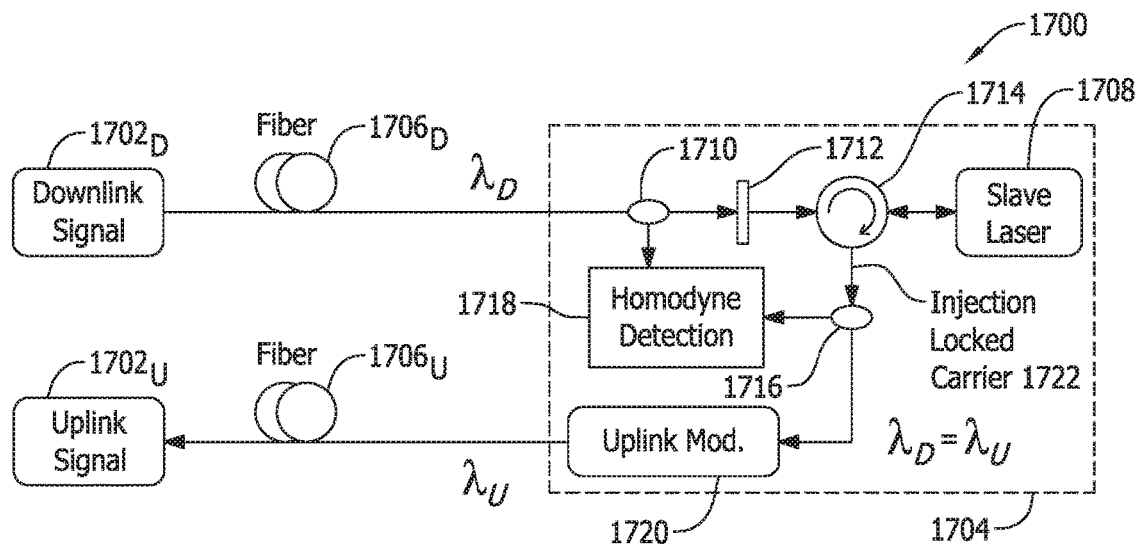
FIG. 17 is a schematic illustration of an exemplary dual-fiber passive optical network system implementing homodyne detection.

FIG. 17 is a schematic illustration of an exemplary dual-fiber PON system 1700 implementing homodyne detection. In an exemplary embodiment, system 1700 represents a CPON configured to implement COIL-based homodyne detection, in a substantially similar manner to system 1400, FIG. 14, and similarly includes a downlink signal $1702_D$ from a high quality parent/master laser source, which is transmitted as a downstream coherent wavelength $\lambda_D$ to an ONU 1704 over a dedicated downstream optical fiber $1706_D$. ONU 1704 includes a slave laser 1708, a first splitter 1710, an optical filter 1712, an optical circulator 1714, a second splitter 1716, a homodyne detection unit/receiver 1718, and an uplink modulator 1720 configured to output a modulated upstream wavelength $\lambda_U$ from an injection locked carrier signal 1722.

In exemplary operation, system 1700 performs similarly to system 1400 with respect to the reception and processing of downlink signal $1702_D$ by ONU 1704, and downstream coherent wavelength $\lambda_D$ again may serve as downlink signal $1702_D$ for both the master source and the LO. In this example, different from the embodiment depicted in FIG. 14, system 1700 further includes a dedicated upstream optical fiber $1706_U$ for optical transport of modulated upstream wavelength $\lambda_U$ (e.g., in a non-full duplex operation).

Figure 18:
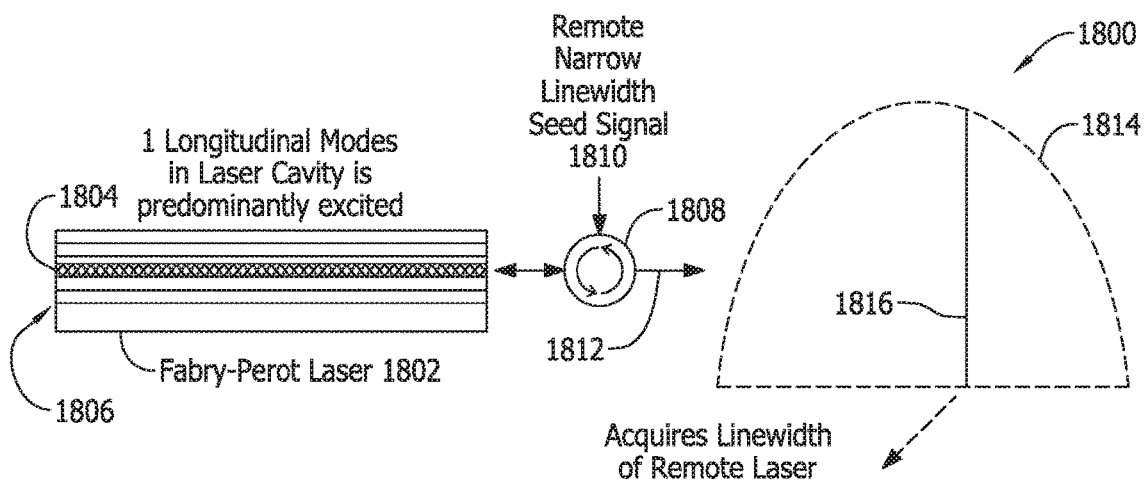
FIG. 18 depicts an exemplary linewidth acquisition effect for a low-cost laser.

FIG. 18 depicts an exemplary linewidth acquisition effect 1800 for low-cost laser 1802 (e.g., FP laser 1210, FIG. 12C). In an exemplary embodiment, laser 1802 is configured to operate as one or more of the slave lasers described among the several embodiments, above. In exemplary operation, a longitudinal mode 1804 in a laser cavity 1806 of laser 1802 is predominately excited by reception, from an optical circulator 1808, of a remote narrow linewidth seed signal 1810 from a downstream master/parent laser source (e.g., ECL laser 1202, FIG. 12C, not shown in FIG. 18). Because only the single longitudinal mode 1804 of laser cavity 806 is excited, a separate port of optical circulator 1808 outputs an upstream (modulated, in the examples above) signal 1812. Thus, despite the fact that the general quality of low-cost laser 1802 is such that an output signal thereof would be expected to conform to frequency distribution curve 1814, according to the advantageous injection looking techniques described herein, output upstream signal 1812 will instead conform to the narrow, high-quality frequency distribution mode 1816 that substantially corresponds to the linewidth acquired from the remote (e.g., at the hub) master/parent laser source.

The advantageous properties of these techniques are described above with respect to homodyne detection configurations. As described further below, these innovative systems and methods are also advantageously applicable to WDM-PON architectures, as well as heterodyne configurations of PON systems.

Figure 19:
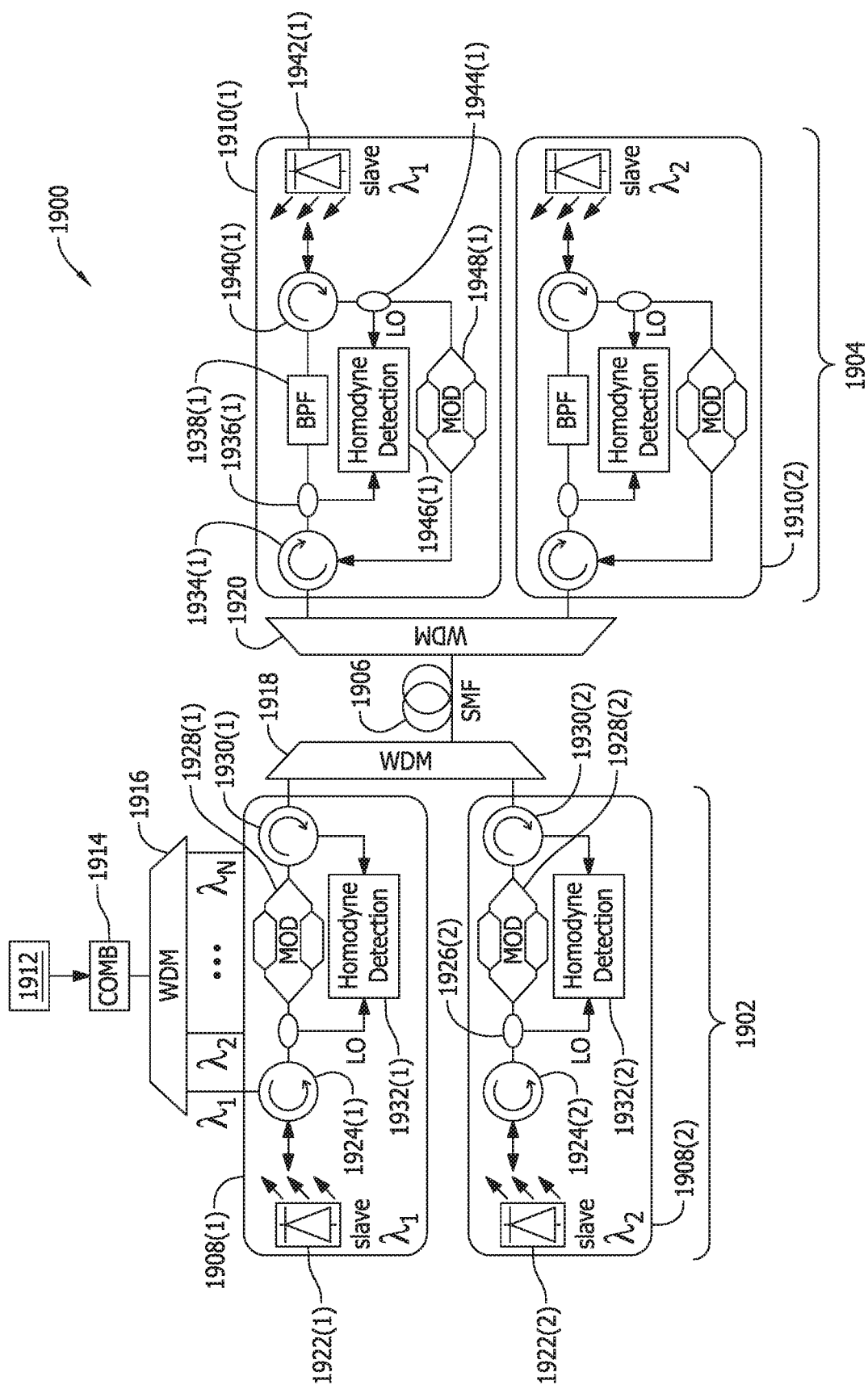
FIG. 19 is a schematic illustration of an exemplary passive optical network system implementing wavelength division multiplexing.

FIG. 19 is a schematic illustration of an exemplary PON architecture 1900 implementing WDM. In an exemplary embodiment, architecture 1900 includes a hub portion 1902 and an end user portion 1904 communicatively coupled over a transport medium 1906 (e.g., a single mode fiber, or SMF). A portion 1902 includes a plurality (e.g., 1-N) of hub transceivers 1908, and end user portion 1904 includes a plurality (e.g., also 1-N) of end user transceivers 1910. In an embodiment, hub portion 1902 of architecture 1900 is configured to receive a master input laser source 1912 (e.g., a high-quality ECL laser source) at an optical comb generator 1914, which together effectively create an optical comb source having an intrinsic property of generating a plurality of simultaneous low-linewidth channels of wavelengths $\lambda_{1-N}$ having easily controlled spacing for master laser source 1912.

In an exemplary embodiment, the particular configuration of optical comb generator 1914 may be according to one or more of a mode-locked laser, an electro-optic modulation scheme, or a gain-switched laser, in accordance with the specific technical parameters of architecture 1900. In an embodiment, optical comb generator 1914 may further include, as an integral or separate component, an EDFA (not separately shown) for amplifying and enhancing the optical power of frequency tones (e.g., 32 tones, 64 tones) generated from optical comb generator 1914.

The generated wavelengths $\lambda_{1-N}$ may then be demultiplexed by a first demultiplexer/demultiplexer 1916 for individual transport to, and processing by, each of hub transceivers 1908. The demultiplexed wavelengths may represent multiple individual CW channels (e.g., 1-N), or may represent a plurality of individual CW source pairs of phase synchronized coherent tones (e.g., multiple separate individual phased synchronized coherent tone source pairs 166, FIG. 1). The respective outputs of hub transceivers 1908 are then combined at a second demultiplexer/demultiplexer 1918 for simultaneous transport over fiber 1906, after which the combined wavelengths may be separated by a third demultiplexer/demultiplexer 1920 for individual reception by respective end user transceivers 1910. In this example, master laser source 1912 is separate from optical comb generator 1914. In other embodiments, master laser source 1912 an optical comb generator 1914 may be integrated as a single unit or apparatus.

Further to the exemplary embodiment, and similar to the several architectures described above, each hub transceiver 1908 may include one or more of an injection locked hub slave laser 1922, a first hub optical circulator 1924, a hub splitter 1926, a hub modulator 1928, a second hub optical circulator 1930, and a hub homodyne detection unit 1932 (e.g., a homodyne receiver). First hub optical circulator 1924 is, for example, configured to receive the respective narrow CW or tone λ, and inject the linewidth properties thereof into hub slave laser 1922. Second hub optical circulator 1930 couples hub transceiver 1908 with fiber 1906 by way of multiplexer/demultiplexer 1918.

In a similar manner, each end user transceiver 1910 may include one or more of a first end user optical circulator 1934, a first end user splitter 1936, an optical filter 1938 (e.g., a bandpass filter, or BPF), a second end user optical circulator 1940, an injection locked end user slave laser 1942, a second end user splitter 1944, an end user homodyne detection unit 1946, and an end user modulator 1948. Operation of each end user transceiver 1910 may then be performed according to one or more of the principles and techniques described above for the respective transceivers depicted in FIGS. 14-17 (e.g., ONUs 1404, 1504, 1604, 1708, respectively). Further to the embodiments described above, architecture 1900 demonstrates how the injection looking techniques of the present systems and methods may be further extended to individual transceivers (e.g., hub transceivers 1908) at the hub location, such as in the case of a PON implementing a separate laser source for each individual channel received from the master seed comb source.

Figure 20:
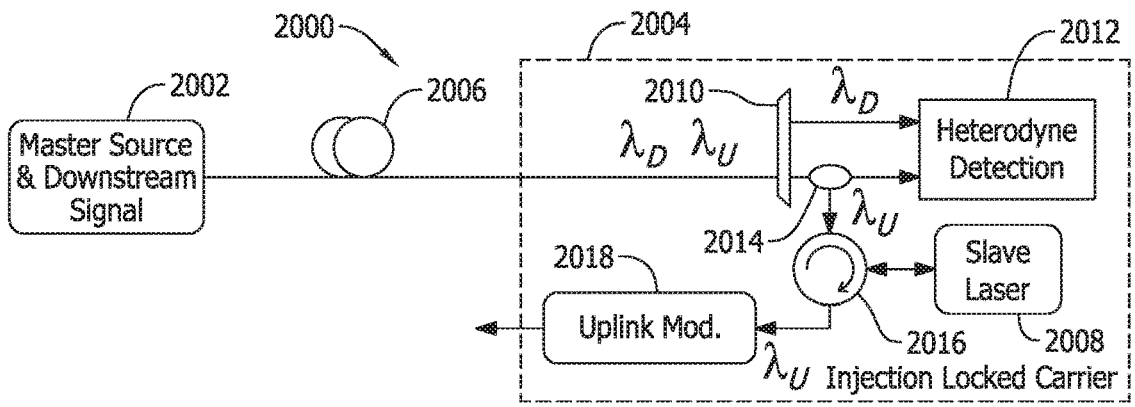
FIG. 20 is a schematic illustration of an exemplary passive optical network system implementing heterodyne detection.

FIG. 20 is a schematic illustration of an exemplary PON system 2000 implementing heterodyne detection. System 2000 is similar, in many aspects, to system 1400, FIG. 14, but system 2000 alternatively configured for heterodyne detection, in contrast to the homodyne detection configuration system 1400. In an exemplary embodiment, system 2000 and also represents a CPON (i.e., primarily the downlink portion thereof) configured to implement COIL-based heterodyne detection, and includes a downstream transmission 2002 from a high quality parent/master laser source, which is transmitted to an ONU 2004 as a downstream coherent wavelength λ (containing both $\lambda_D$ and $\lambda_U$) over an optical fiber 2006.

In an embodiment, ONU 2004 includes a slave laser 2008 and one or more of an optical filter 2010, a heterodyne detection unit 2012 (e.g., a downlink heterodyne coherent receiver), a splitter 2014, an optical circulator 2016, and an uplink modulator 2018 configured to output a modulated signal of wavelength $\lambda_U$. In the exemplary embodiment, system 2000 may be similarly implemented at the end user location of one or more of the respective systems described above (i.e., where heterodyne detection is desired). Downstream transmission 2002 may, for example, include both a master CW laser source and a plurality of downstream signals λ on two separate wavelengths generated at central office or hub location. Downstream transmission 2002 therefore serves to provide both remote LO and master source delivery to ONU 2004.

In exemplary operation of system 2000, for the downlink, the received transmission 2002 is separated by optical filter 2010 with the signal from one arm thereof (i.e., $\lambda_D$) fed directly to downlink heterodyne detection unit 2012, and the signal from the other arm (i.e., $\lambda_U$) split by splitter 2014 (e.g., a 3-dB splitter), with one split returned heterodyne detection unit/coherent receiver 2012 as the LO, and the other split injected into the low-cost laser source of slave laser 2008 by way of optical circulator 2016. After injection locking with slave laser 2008, the newly injected signal (i.e., modulated $\lambda_U$) is sent to uplink modulator 2018 to provide the uplink optical source, which may be communicated upstream by way of a full duplex coherent optical connection schemes using an optical circulator (e.g., FIGS. 21-23, below), or realized by a dedicated separate, second fiber (e.g., FIG. 24, below).

Similar to system 1400, FIG. 14, in the case of asymmetrical modulation, the upstream optical source of system 2000 may employ an intensity modulation scheme, such as NRZ-OOK. In an alternative embodiment, injection locking may be performed prior to splitting by splitter 2014 (e.g., described further below with respect to FIG. 22), with one arm therefrom used for the downlink LO, and the other arm used for the uplink CW source (i.e., modulated $\lambda_U$).

According to the advantageous configuration of system 2000, a centralized comb light source at the OLT (e.g., laser source 1912 and optical home generator 1914, FIG. 19, not shown in FIG. 20) serves to provide both master seeding sources and LO signals for both of the downstream and upstream directions in a heterodyne detection configuration. This advantageous configuration enables a PON system to reuse optical sources, in contrast to intradyne detection techniques conventionally implemented in long-haul systems. Thus, and similar to the homodyne detection configurations described above, only one relatively low-cost slave laser (e.g., an FP laser source) need be employed at each ONU 2004 to realize the effective performance of the high-cost master laser (e.g., an ECL laser source).

Figure 21:
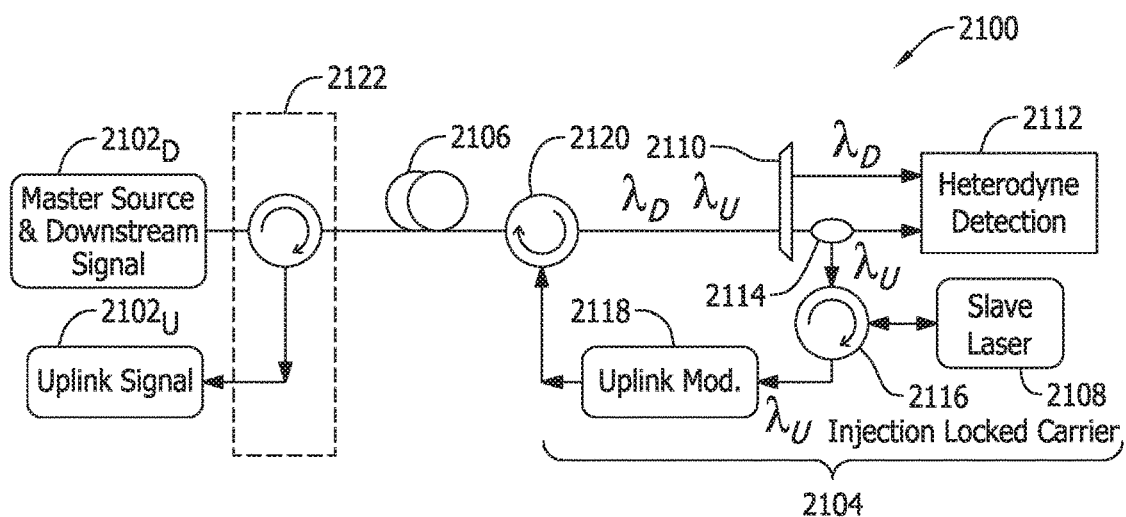
FIG. 21 is a schematic illustration of an exemplary passive optical network system implementing heterodyne detection in a full duplex operation.

FIG. 21 is a schematic illustration of an exemplary PON system 2100 implementing heterodyne detection in a full duplex operation. In an exemplary embodiment, system 2100 represents a CPON configured to implement COIL-based heterodyne detection, in a substantially similar manner to system 2000, FIG. 20, and includes a downstream transmission $2102_D$ from a high quality parent/master laser source, which is transmitted to an ONU 2104 as a downstream coherent wavelength λ (containing both $\lambda_D$ and $\lambda_U$) over an optical fiber 2106. ONU 2104 similarly includes a slave laser 2108, an optical filter 2110, a heterodyne detection unit 2112 (e.g., a downlink heterodyne coherent receiver), a splitter 2114, an optical circulator 2116, and an uplink modulator 2118 configured to output a modulated, injection locked uplink signal $2102_U$.

In exemplary operation, system 2100 performs similarly to system 2000 with respect to the reception and processing of downstream transmission $2102_D$ by ONU 2104. Different though, from the embodiment depicted in FIG. 20, system 2100 further includes an end user optical circulator 2120 disposed at the end of fiber 2106 that couples with ONU 2104, and a hub optical circulator 2122 disposed at the end of fiber 2106 that couples with the headend/hub (not shown in FIG. 20). Apart from the implementation of heterodyne detection (as opposed to homodyne detection) end user optical circulator 2120 and hub optical circulator 2122 are substantially similar in structure and function to end user optical circulator 1526 and hub optical circulator 1524, FIG. 15, respectively.

Figure 22:
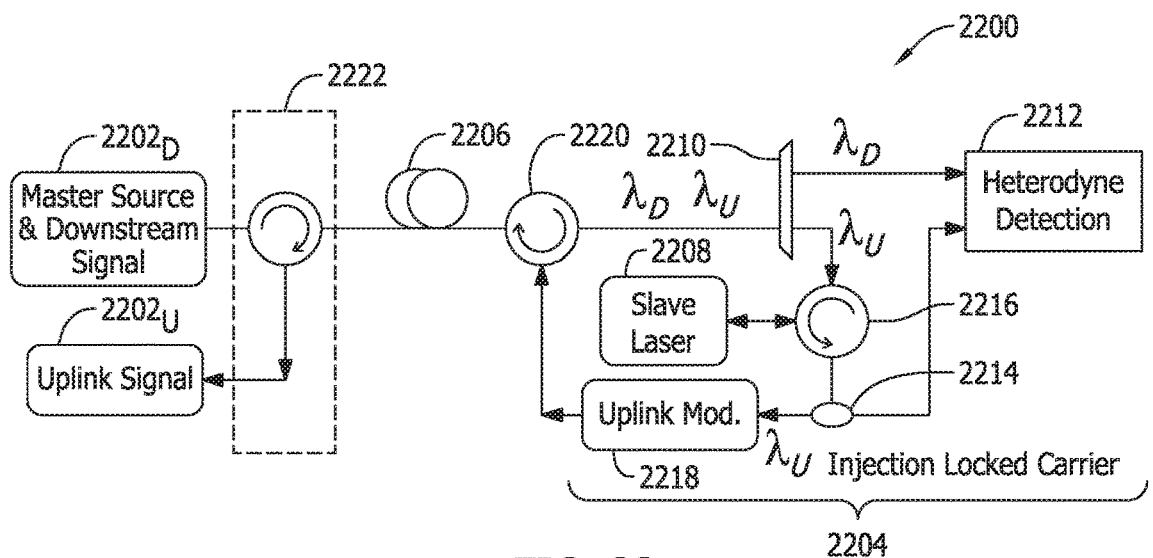
FIG. 22 is a schematic illustration of an alternative passive optical network system implementing heterodyne detection in a full duplex operation.

FIG. 22 is a schematic illustration of an alternative PON system 2200 implementing heterodyne detection in a full duplex operation. In an exemplary embodiment, system 2200 represents a CPON configured to implement COIL-based heterodyne detection, in a substantially similar manner to system 2100, FIG. 21, and includes a downstream transmission $2202_D$ from a high quality parent/master laser source, which is transmitted to an ONU 2204 as a downstream coherent wavelength λ (containing both $\lambda_D$ and $\lambda_U$) over an optical fiber 2206. ONU 2204 similarly includes a slave laser 2208, an optical filter 2210, a heterodyne detection unit 2212, a splitter 2214, an optical circulator 2216, an uplink modulator 2218 configured to output a modulated, injection locked uplink signal $2202_U$, an end user optical circulator 2220, and a hub optical circulator 2222.

System 2200 differs from system 2100 in regard to the structural configuration of ONU 2204. Specifically, and as described above with respect to FIG. 20, in ONU 2204, injection locking to slave laser 2208 is performed directly from the $\lambda_U$ arm from filter 2210 (i.e., by way of optical circulator 2216), and prior to reaching splitter 2214, which then provides one modulated $\lambda_U$ split to heterodyne detection unit 2212 to be used for the downlink LO, and the other modulated $\lambda_U$ split to uplink modulator 2218 to be used for the uplink CW source of uplink signal $2202_U$.

Figure 23:
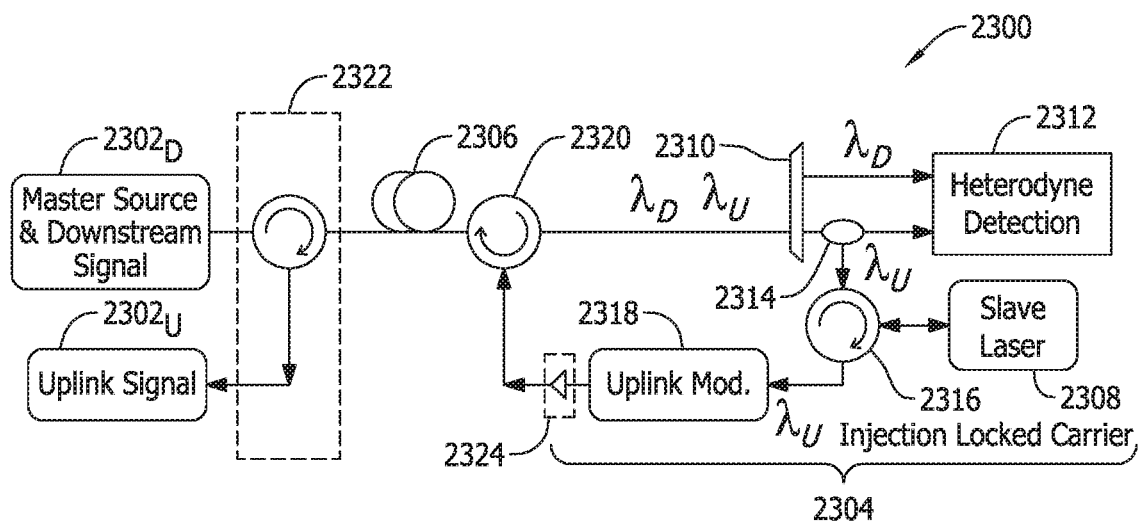
FIG. 23 is a schematic illustration of an exemplary passive optical network system implementing heterodyne detection in a full duplex operation.

FIG. 23 is a schematic illustration of an exemplary PON system 2300 implementing heterodyne detection in a full duplex operation. In an exemplary embodiment, system 2300 represents a CPON configured to implement COIL-based homodyne detection, in a substantially similar manner to system 2100, FIG. 21, and similarly includes a downstream transmission $2302_D$ from a high quality parent/master laser source, which is transmitted to an ONU 2304 as a downstream coherent wavelength λ (containing both $\lambda_D$ and $\lambda_U$) over an optical fiber 2306. ONU 2304 similarly includes a slave laser 2308, an optical filter 2310, a heterodyne detection unit 2312, a splitter 2314, an optical circulator 2316, an uplink modulator 2318 configured to output a modulated, injection locked uplink signal $2302_U$, an end user optical circulator 2320, and a hub optical circulator 2322.

Different from system 2100 though, system 2300 further includes an SOA 2324 disposed along the path of uplink signal $2302_U$ between uplink modulator 2318 and end user optical circulator 2320. Although not illustrated in FIG. 23, SOA may be similarly disposed in the alternative full duplex heterodyne configuration depicted in FIG. 22, for example, between uplink modulator 2218 and end user optical circulator 2220.

Figure 24:
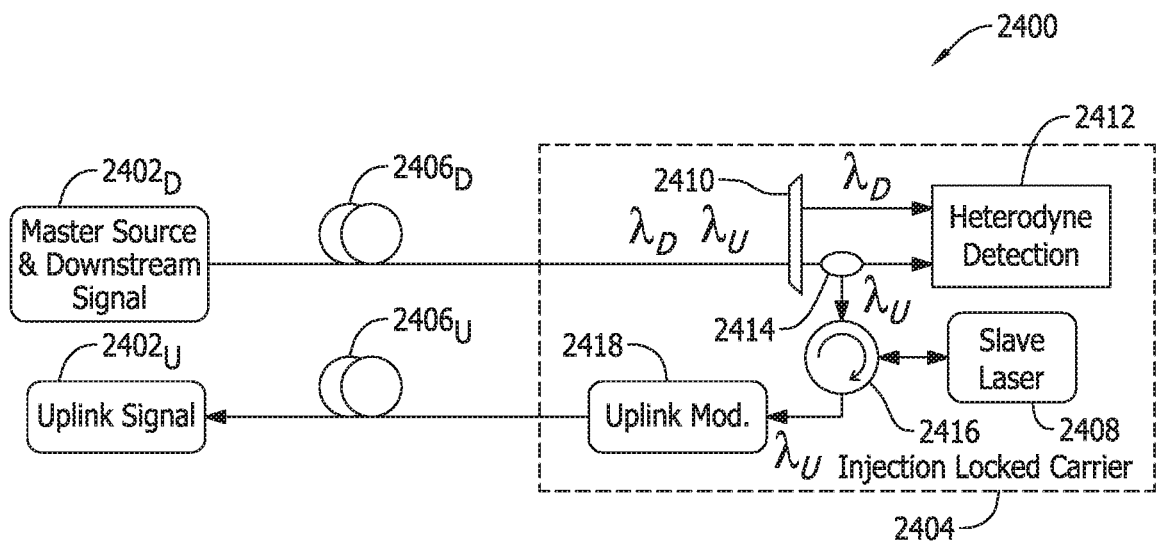
FIG. 24 is a schematic illustration of an exemplary dual-fiber passive optical network system implementing heterodyne detection.

FIG. 24 is a schematic illustration of an exemplary dual-fiber PON system 2400 implementing heterodyne detection. In an exemplary embodiment, system 2400 represents a CPON configured to implement COIL-based homodyne detection, in a substantially similar manner to system 2000, FIG. 20, and includes a downlink transmission $2402_D$ from a high quality parent/master laser source, which is transmitted to an ONU 2404 over a dedicated downstream optical fiber $2406_D$. ONU 2404 includes a slave laser 2408, an optical filter 2410, a heterodyne detection unit 2412, a splitter 2414, an optical circulator 2416, and an uplink modulator 2418 configured to output a modulated, injection locked uplink signal $2402_U$.

In exemplary operation, system 2400 performs similarly to system 2000 with respect to the reception and processing of downlink transmission $2402_D$ by ONU 2404. In this example though, and different from the embodiment depicted in FIG. 20, system 2400 further includes a dedicated upstream optical fiber $2406_U$ for optical transport of modulated, injection locked uplink signal $2402_U$ (e.g., in a non-full duplex operation).

According to the innovative systems and methods described herein, the problems experienced with conventional direct detection PONs (i.e., poor receiver sensitivity, power fading due to chromatic dispersion at high symbol rates and long transmission distances, bandwidth- and power-inefficient modulation, etc.) are overcome. The CPONs of the present systems and methods are capable of fully realizing the benefits of coherent optical technology (i.e., frequency selectivity, linear detection, superior receiver sensitivity, etc.) but in a significantly more cost-effective solution than has been previously available for coherent systems. That is, the present COIL-based architectural configurations for a P2MP network effectively extend the reach and split ratio to multiple end-users, and residential home subscribers in particular, at approximately the present cost of conventional direct detection systems, but also at performance levels comparable to present coherent P2P links.

Exemplary embodiments of optical communication systems and methods are described above in detail. The systems and methods of this disclosure though, are not limited to only the specific embodiments described herein, but rather, the components and/or steps of their implementation may be utilized independently and separately from other components and/or steps described herein. Additionally, the exemplary embodiments can be implemented and utilized in connection with other access networks utilizing fiber and coaxial transmission at the end user stage.

As described above, the DOCSIS protocol may be substituted with, or further include protocols such as EPON, RFoG, GPON, Satellite Internet Protocol, without departing from the scope of the embodiments herein. The present embodiments are therefore particularly useful for communication systems implementing a DOCSIS protocol, and may be advantageously configured for use in existing 4G and 5G networks, and also for new radio and future generation network implementations.

Although specific features of various embodiments of the disclosure may be shown in some drawings and not in others, such illustrative techniques are for convenience only. In accordance with the principles of the disclosure, a particular feature shown in a drawing may be referenced and/or claimed in combination with features of the other drawings.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a DSP device, and/or any other circuit or processor capable of executing the functions described herein. The processes described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term "processor."

This written description uses examples to disclose the embodiments, including the best mode, and also enables a person skilled in the art to practice the embodiments, including the make and use of any devices or systems and the performance of any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An optical communication network for a passive optical network (PON) system architecture, comprising:
    an optical hub including at least one parent seed laser source and at least one optical line terminal (OLT) configured to transmit a downstream signal of the parent seed laser source, wherein the downstream signal includes a plurality of spaced wavelength channels;
    an optical transport medium configured to carry the downstream signal from the optical hub; and
    a plurality of distributed optical network units (ONUs) operably coupled to the optical transport medium, each ONU of the plurality of distributed ONUs (i) configured to receive at least one channel of the plurality of spaced wavelength channels, and (ii) including at least one child laser source injection locked to the parent seed laser source,
    wherein each ONU comprises (i) an optical circulator configured to receive a linewidth of the parent laser source and inject the received linewidth into a respective child laser source of the ONU, (ii) an optical receiver configured to perform homodyne detection to detect the at least one channel received at the respective ONU.

2. An optical communication network for a passive optical network (PON) system architecture, comprising:
    an optical hub including at least one parent seed laser source and at least one optical line terminal (OLT) configured to transmit a downstream signal of the parent seed laser source, wherein the downstream signal includes a plurality of spaced wavelength channels;
    an optical transport medium configured to carry the downstream signal from the optical hub; and
    a plurality of distributed optical network units (ONUs) operably coupled to the optical transport medium, each ONU of the plurality of distributed ONUs (i) configured to receive at least one channel of the plurality of spaced wavelength channels, and (ii) including at least one child laser source injection locked to the parent seed laser source,
    wherein each ONU comprises (i) an optical circulator configured to receive a linewidth of the parent seed laser source and inject the received linewidth into a respective child laser source of the ONU, (ii) an optical receiver configured to detect the respective at least one channel received at the ONU, and (iii) an uplink modulator configured to transmit a modulated, injection locked upstream signal from the respective child laser source to the optical hub.

3. The network of claim 2, wherein the optical receiver is configured to perform heterodyne detection.

4. The network of claim 2, wherein the optical transport medium comprises a single mode fiber configured to carry both of the downstream signal and the modulated, injection locked upstream signal.

5. The network of claim 4, wherein the PON system architecture comprises a full duplex coherent PON.

6. The network of claim 2, wherein the optical transport medium comprises a first dedicated optical fiber configured to carry the downstream signal from the optical hub to the ONU, and a second dedicated optical fiber configured to carry the modulated, injection locked upstream signal from the ONU to the optical hub.

7. The network of claim 2, wherein the child laser source comprises a Fabry-Perot (FP) laser.

8. The network of claim 7, wherein the at least one parent seed laser source comprises an external cavity laser (ECL).

9. The network of claim 8, where the optical hub further comprises an optical comb generator having an input configured to receive an output beam of the ECL laser, and an output configured to generate the plurality of spaced wavelength channels for transport to the OLT.

10. The network of claim 2, further comprising at least 500 ONUs communicatively coupled with a single OLT at the optical hub.

11. The network of claim 10, wherein the PON system architecture comprises a point to multipoint (P2MP) configuration.

12. The network of claim 11, wherein the optical hub is further configured to communicatively couple with a plurality of optical source fibers from a remote distributed access system.

13. The network of claim 12, wherein the plurality of optical source fibers each comprise an individual respective point to point (P2P) to link.

14. The network of claim 13, wherein the single OLT further comprises at least one secondary laser source (i) injection locked to a linewidth and frequency of the at least one parent seed laser source, and (ii) in operable communication with a respective optical source fiber of the individual respective P2P to link.

15. A coherent optical transceiver in operable communication with an optical transport medium of an optical communication network, the coherent optical transceiver comprising:
an optical circulator configured to receive a downstream coherent signal from the optical transport medium, the downstream coherent signal including a plurality of spaced wavelength channels from an upstream transmission source;
a child laser source in operable communication with the optical circulator and configured for injection locking to a linewidth of a parent seed laser of the upstream transmission source;
an optical receiver in operable communication with the optical circulator and configured to detect the at least one channel of the plurality of spaced wavelength channels; and
an uplink modulator configured to transmit a modulated, injection locked upstream signal from the child laser source onto the optical transport medium.

16. The coherent optical transceiver of claim 15, wherein the optical communication network comprises a passive optical network (PON) system architecture.

17. The coherent optical transceiver of claim 15, wherein the optical receiver is further configured to perform homodyne detection.

18. The coherent optical transceiver of claim 15, wherein the optical receiver is further configured to perform heterodyne detection.

19. The coherent optical transceiver of claim 15, comprising an optical network unit (ONU).

20. The coherent optical transceiver of claim 15, wherein the child laser source comprises a Fabry-Perot (FP) laser.

* * * * *